(12) United States Patent
Suginouchi et al.

(10) Patent No.: US 7,617,731 B2
(45) Date of Patent: Nov. 17, 2009

(54) ULTRASONIC MEASURING APPARATUS AND ULTRASONIC MEASURING METHOD

(75) Inventors: Takehiko Suginouchi, Kyoto (JP); Yong Wang, Kyoto (JP); Masahiko Hashimoto, Osaka (JP)

(73) Assignee: Panasonic Corporation, Kadoma (JP)

( * ) Notice: Subject to any disclaimer, the term of this patent is extended or adjusted under 35 U.S.C. 154(b) by 397 days.

(21) Appl. No.: 11/718,001

(22) PCT Filed: Nov. 9, 2006

(86) PCT No.: PCT/JP2006/022377

§ 371 (c)(1),
(2), (4) Date: Apr. 26, 2007

(87) PCT Pub. No.: WO2008/010306

PCT Pub. Date: Jan. 24, 2008

(65) Prior Publication Data

US 2009/0145232 A1    Jun. 11, 2009

(30) Foreign Application Priority Data

Jul. 18, 2006  (JP) .............................. 2006-195266

(51) Int. Cl.
*G01N 29/40* (2006.01)
*G01N 29/44* (2006.01)
*G01N 29/50* (2006.01)
*G01B 5/14* (2006.01)
*G01N 29/52* (2006.01)

(52) U.S. Cl. ........................................ 73/602; 702/159
(58) Field of Classification Search .................. 73/602; 702/159
See application file for complete search history.

(56) References Cited

U.S. PATENT DOCUMENTS 5,461,921 A * 10/1995 Papadakis et al. ............. 73/628
(Continued)

FOREIGN PATENT DOCUMENTS

JP        07-303092        11/1995
(Continued)

OTHER PUBLICATIONS

International Search Report for corresponding Application No. PCT/JP2006/322377 mailed Dec. 19, 2006.

*Primary Examiner*—Hezron Williams
*Assistant Examiner*—Rose M Miller
(74) *Attorney, Agent, or Firm*—Renner, Otto, Boisselle & Sklar, LLP

(57) ABSTRACT

An ultrasonic measuring method includes the steps of: receiving ultrasonic waves, which have been transmitted by a spread spectrum technique using mutually different codes, at first and second receivers, thereby generating first and second received signals, respectively; generating interference signals, of which the amplitudes are equal to or greater than respective threshold values, from the first and second received signals that have been despread with a code that has been used to spread any of the ultrasonic waves other than a desired one; removing the spread interference signals from the first and second received signals; calculating maximum correlation values between the first and second despread received signals for the respective threshold values; selecting one of the threshold values, at which the greatest one of the maximum correlation values has been obtained, as a threshold value for canceling interference; and calculating the propagation distance or propagation azimuth of the desired ultrasonic wave by the amount of time it has taken for the first and second received signals to arrive.

14 Claims, 25 Drawing Sheets

U.S. PATENT DOCUMENTS

| | | |
|---|---|---|
| 5,579,304 A | 11/1996 | Sugimoto et al. |
| 5,668,775 A * | 9/1997 | Hatteland ............... 367/19 |
| 6,081,516 A | 6/2000 | Yoshida et al. |
| 6,222,498 B1 | 4/2001 | Ishii et al. |
| 6,778,592 B1 | 8/2004 | Haga et al. |
| 2002/0155812 A1 | 10/2002 | Takada |

FOREIGN PATENT DOCUMENTS

| | | |
|---|---|---|
| JP | 7-122668 | 12/1995 |
| JP | 10-51353 | 2/1998 |
| JP | 11-088230 | 3/1999 |
| JP | 11-205286 | 7/1999 |
| JP | 2000-261412 | 9/2000 |
| JP | 2000-353981 | 12/2000 |
| JP | 2002-271234 | 9/2002 |
| JP | 2004-108826 | 4/2004 |
| WO | WO 2009044528 A1 * | 4/2009 |

* cited by examiner

*FIG.11*
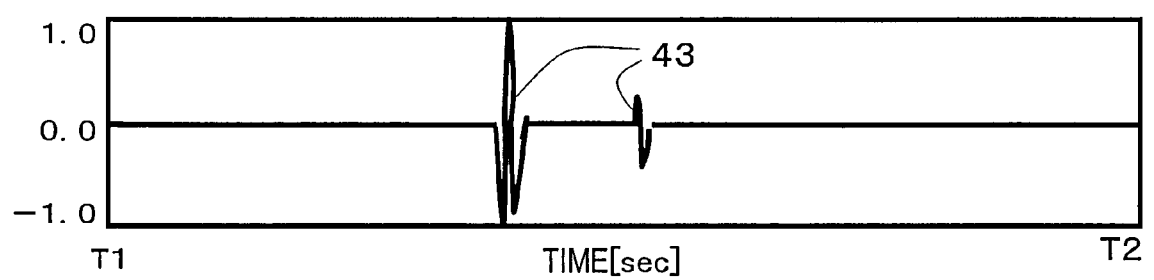
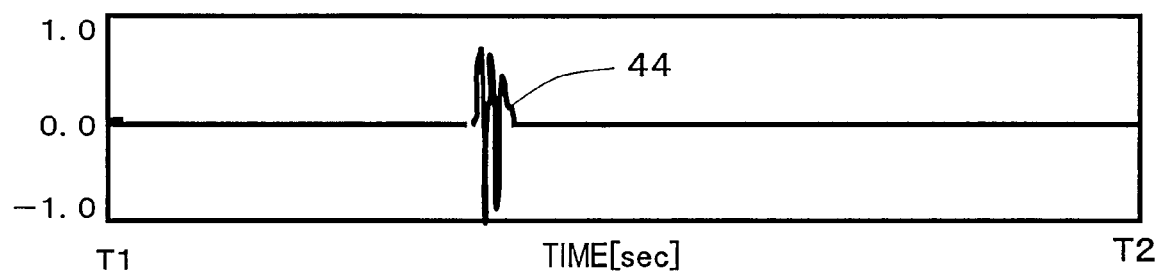
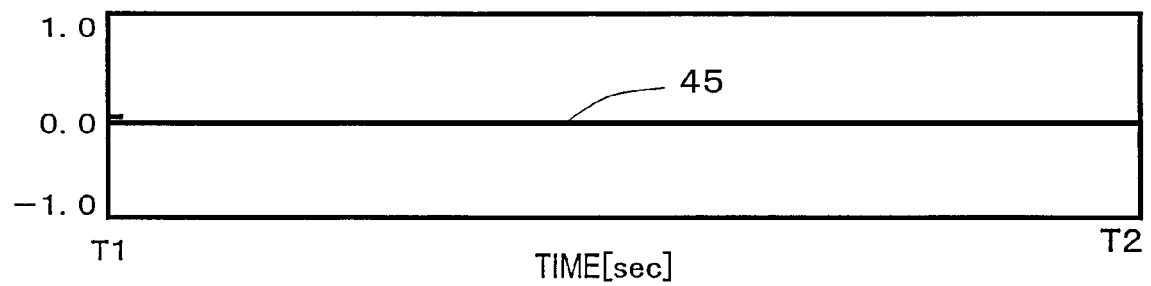

FIG.20
(a)
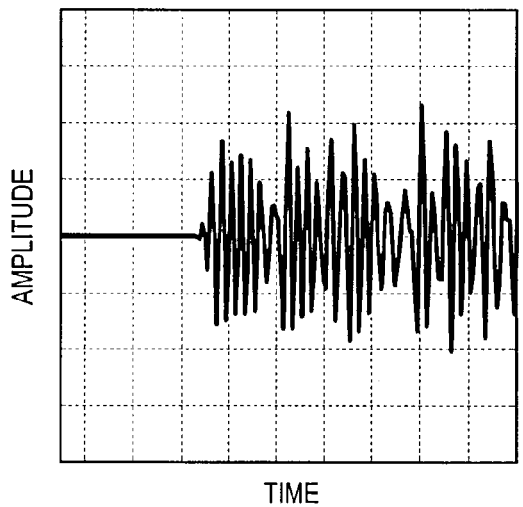
(b)
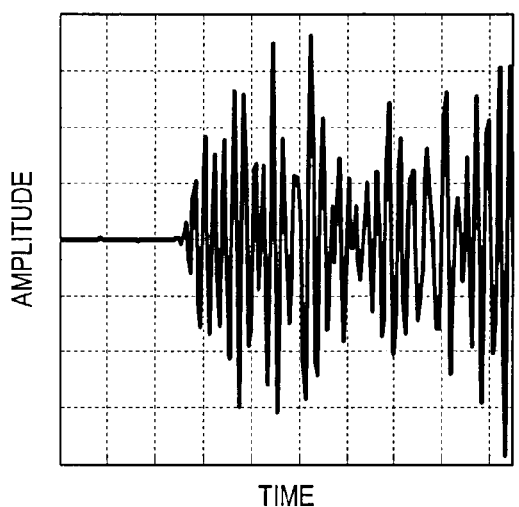
(c)
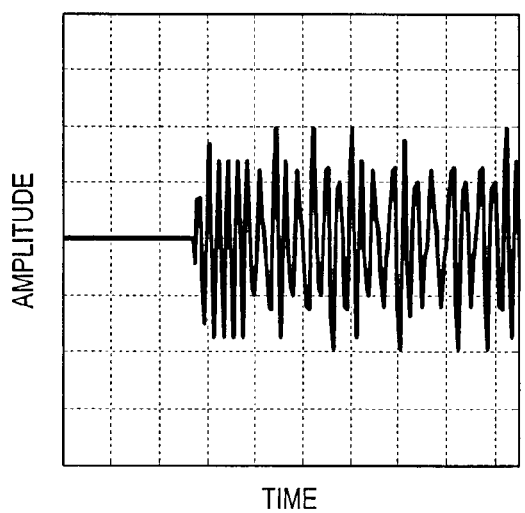
(d)
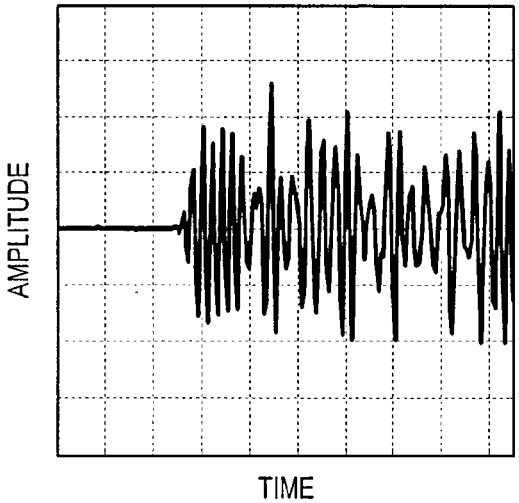

*FIG.21*
(a)
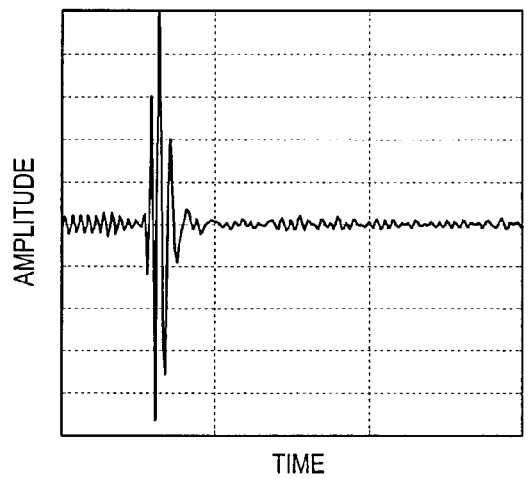
(b)
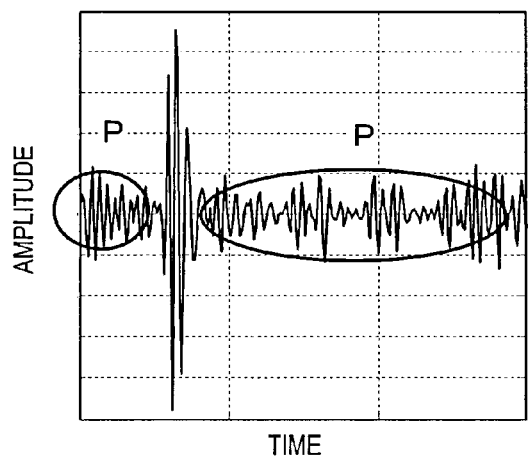
(c)
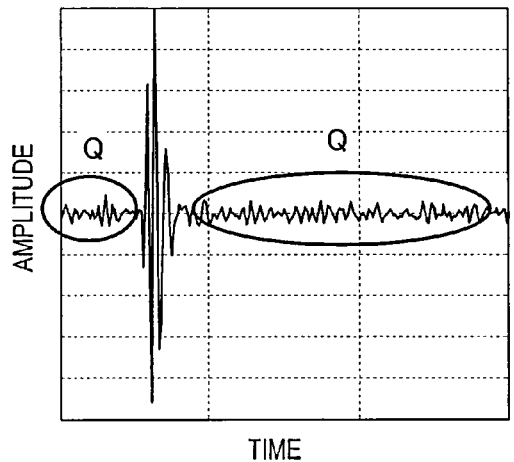

ULTRASONIC MEASURING APPARATUS AND ULTRASONIC MEASURING METHOD

TECHNICAL FIELD

The present invention relates to an apparatus and method for ultrasonic measuring. More particularly, the present invention relates to an apparatus and method that can accurately estimate the propagation distance or propagation azimuth of an ultrasonic wave even in an environment in which a plurality of ultrasonic signals could interfere with each other.

BACKGROUND ART

An ultrasonic measuring apparatus includes a transmitter to send out an ultrasonic wave and a receiver to receive the ultrasonic wave and estimates the distance between the transmitter and the receiver by the amount of time it has passed since the transmitter sent out the ultrasonic wave and until the receiver receives the ultrasonic wave. Alternatively, another ultrasonic measuring apparatus may estimate the distance between an object and the ultrasonic measuring apparatus itself by the amount of time it has taken for an ultrasonic wave, sent out from the transmitter, to reach the object, get reflected by the object and then get received at the receiver.

In an environment where there are a number of ultrasonic measuring apparatuses, the ultrasonic signals transmitted by the respective ultrasonic measuring apparatuses would interfere with each other, thus possibly causing measurement errors if no countermeasures were taken. To avoid such a situation, somebody proposed a method for preventing the ultrasonic signals from interfering with each other by making the ultrasonic measuring apparatuses transmit the ultrasonic signals at mutually different times. Another person proposed a method for distinguishing the ultrasonic signals from each other by encoding the ultrasonic signals, generated by the respective ultrasonic measuring apparatuses, with mutually different codes.

The former method is called "time-division transmission" and has been used as a simple method. However, if the respective ultrasonic measuring apparatuses were independent of each other, it is impossible for any of the apparatuses to know when the other ultrasonic measuring apparatuses will transmit the ultrasonic signals. That is why it is difficult to adjust the timings to transmit the ultrasonic signals so as to not to cause any interference.

A conventional ultrasonic measuring apparatus that adopts the latter method is disclosed in Patent Document No. 1, for example. FIG. 22 is a block diagram showing the conventional ultrasonic measuring apparatus disclosed in Patent Document No. 1. Hereinafter, the basic operation of this conventional ultrasonic measuring apparatus 101 will be described. The ultrasonic measuring apparatus 101 includes a transmitter 8, a receiver 9, a correlator 103, a peak detector 104 and a pulse generator 105.

The pulse generator 105 generates a drive signal for the transmitter 8, which sends out an ultrasonic signal into the space. The ultrasonic signal transmitted passes through an ultrasonic wave propagation path 7 to reach an object 2 and get reflected by the object 2. The ultrasonic signal reflected passes through the ultrasonic wave propagation path 7 again to reach the receiver 9.

The drive signals are encoded with mutually different codes by respective ultrasonic measuring apparatuses so as to be identified from each other even when the ultrasonic signals sent out by those apparatuses interfere with each other. Considering such a situation where a desired signal should be decrypted and extracted from a number of signals interfering with each other, the other signals are preferably quite dissimilar from the desired one. Random signals that are generated artificially under a predetermined rule so as to have such a characteristic are called "pseudo random signals".

Digital signals represented as a combination of zeros and ones are often used as the pseudo random signals because digital signals are easy to process. Examples of known digital pseudo random signals include an M-sequence, a Barker sequence and a Golay sequence. Among other things, the M-sequence functions as a code for use in a telecommunications system that adopts the spread spectrum technology, i.e., a noise-like identifiable carrier for the information to be transmitted. One of two different M-sequences looks nothing but noise for the other. That is why it is very effective to extract its own signal. Also, even if there are two identical M-sequences, one of the two also looks nothing but noise for the other when there is even a slight time lag between them. As a result, it can be seen at what time a particular M-sequence is present among the time series of those interfering received signals.

The drive signal generated by the pulse generator 105 is a spread spectrum (M-sequence discrete) random wave. Patent Document No. 1 realizes a pseudo random signal with such a characteristic by binary frequency shift keying in which the frequency associated with bit one and the frequency associated with bit zero are different from each other.

The ultrasonic wave that has left the transmitter 8, passed through the ultrasonic wave propagation path 7 and then reached the receiver 9 has its correlation with the pseudo random signal, generated by the pulse generator 105, examined by the correlator 103. The peak detector 104 detects the peak of the correlation value. The time when the correlation value reaches its peak represents the time when the ultrasonic wave, sent out from the transmitter 8, reaches the receiver 9. And the interval between the time when the ultrasonic wave was transmitted and the time when the correlation value reaches its peak represents the propagation time of the ultrasonic wave to the object 2. Consequently, the distance from the ultrasonic measuring apparatus 101 to the object 2 can be measured by the propagation velocity of the ultrasonic wave.

The (M-sequence discrete) spread spectrum pseudo random signals are unique signals for respective ultrasonic measuring apparatuses. That is why even if an ultrasonic wave that has been sent out from another ultrasonic measuring apparatus reaches the receiver 9, its correlation with the pseudo random signal generated by the pulse generator 105 is very little. Consequently, no peak is detected by the correlator 103 and the ultrasonic measuring apparatus 101 can identify a pseudo random signal that has come from another ultrasonic measuring apparatus.

In the field of radio communications, on the other hand, to maintain good communications even in an environment in which a lot of signals are interfering with each other, the code of a signal to transmit is made redundant and used for error correction or the interference is canceled by subtracting extra signals (i.e., signals other than its own signal) from the received signal according to known techniques. Particularly, in the field of cellphones, to let the base station cancel the interference between the signals that have been encoded with mutually different codes by individual users, various interference cancellers have been proposed. For example, Patent Document No. 2 discloses an interference canceller for use in the base station of cellphones.

FIG. 23 is a block diagram showing the interference canceller disclosed in Patent Document No. 2, which includes an interference canceller block 106 and a demodulation processing section 107. The interference canceller block 106 includes delay processing sections 108(1) through 108(N) for causing delays in the received signal and interference canceling sections 109(1) through 109(N) for extracting extra signals, other than the desired one, from the received signal.

In the interference canceller block 106, the interference canceling sections 109(1) through 109(N) makes replicas of the other extra signals, except the desired one, using all N types of codes but the one used for the desired signal, and subtracts the replica signals, other than the desired one, from the received input signal 110. In this case, the delay processing sections 108(1) through 108(N) delays the received signal 110 until the outputs of the interference canceling sections 109(1) through 109(N) are obtained and such that the outputs of the interference canceling sections 109(1) through 109(N) are synchronized with the received signal 110 during the subtraction process.

The demodulation processing section 107 performs demodulation processing on the desired signal using this output signal. As a result, the interference caused by the extra signals, other than the desired one, can be canceled and the signal quality can be improved compared to a situation where demodulation is performed without using the interference canceller block 106. If this series of processing is carried out repeatedly a number of times by changing this interference canceller block 106 into a multi-stage one, then the interference can be canceled even more effectively.

The information transmitted from a cellphone has been encoded by being multiplied by a pseudo random signal such as an M-sequence signal. This processing will be referred to herein as "spreading processing". The encoded information is transmitted on a sine wave called a "carrier". In that case, the phases (e.g., 0 degrees and 180 degrees) of the sine wave correspond to one and zero of the encoded information.

In the base station, to retrieve information from the signal that has been transmitted from the cellphone, despreading processing, which is the inverse processing of the spreading processing, is carried out. It is determined by reference to the phase information of a despread signal whether the signal is zero or one. This processing will sometimes be referred to herein as "demodulation".

FIG. 24 is a block diagram showing how the interference canceling section 109(N) operates. The interference canceling section 109(N) includes a number K (where K is an integer and equal to or greater than one) of despreading blocks 111(1) through 111(K) and spreading blocks 117(1) through 117(K) for multiple propagation paths and a decision section 116. The information about the multiple propagation paths should be collected in advance by predicting what multiple paths there will be. The despreading block 111(1) includes a despreading section 112(1), a complex conjugating section 113(1), a propagation path estimating section 114, and a multiplier 115(1). On the other hand, the spreading block 117(1) includes a multiplier 119(1) and a spreading section 118(1). Each of the other despreading blocks 111(2) through 111(K) also includes the same components as the despreading block 111(1) and each of the other spreading blocks 117(2) through 117(K) also includes the same components as the spreading block 117(1).

The despreading section 112(K) despreads the received signal using the spread code of the $n^{th}$ user (where n is an integer and $1 \leq n \leq N$) synchronously with the $k^{th}$ one (where k is an integer and $1 \leq k \leq K$) of the multiple propagation paths. The output of the despreading section 112($k$) is supplied to the multiplier 115($k$), which receives the propagation path characteristic from the propagation path estimating section 114($k$) by way of the complex conjugating section 113($k$) and multiplies the output of the despreading section 112($k$) and the propagation path characteristic together. The propagation path estimating section 114 outputs known information called a "pilot signal" (such as the repetition of 101010) before providing the propagation path characteristic. Thus, it can be estimated how much the magnitude of the signal has varied and how long the signal has been delayed by going through the propagation path after the despreading. The estimated values are complex numbers. The time lags on all of the multiple propagation paths are adjusted using these values.

At the same time, the multiplier 115 weights the amplitude of the output of the despreading section 112 with the output of the complex conjugating section 113($k$) for the purpose of rake combination (i.e., combining maximum ratios with each other). The radio waves that have propagated through the respective paths arrive at mutually different times due to the difference in their path length. The technique of increasing the responsively by eliminating such time lags and adding together all radio waves that have propagated through the respective paths is called "rake combination".

Thereafter, the weighted detected outputs supplied from the respective multipliers 115 for the K paths are subjected to the rake combination and then the combined output is supplied to the decision section 116, which determines the most likely transmission symbol (i.e., whether it is zero or one).

The spreading blocks 117 are connected in series to the K paths, respectively. The output of the decision section 116 and the propagation path characteristic, which is the output of the propagation path estimating section 114, are multiplied together by the multiplier 119(K) on a path-by-path basis. The spreading section 118 spreads the output of the multiplier 119(K) using the spread code of the $n^{th}$ user synchronously with its associated path (i.e., the $k^{th}$ path) of the multiplier. Then, the replica signals for the respective paths, which are the K outputs of the spreading sections 118, are combined with each other, thereby obtaining a replica signal for the $n^{th}$ user.

The interference canceller ranks the reception levels of all users in advance and performs the demodulation and interference canceling processing at each stage in the descending order of the levels. The reception levels may be ranked either only once using the received signal or a number of times sequentially at the respective stages using the interference canceling signal.

Patent Document No. 1: Japanese Patent Application Laid-Open Publication No. 2004-108826

Patent Document No. 2: Japanese Patent Application Laid-Open Publication No. 10-51353

DISCLOSURE OF INVENTION

Problems to be Solved by the Invention

In the environment in which a number of ultrasonic measuring apparatuses are operating as disclosed in Patent Document No. 1, an ultrasonic wave to transmit is encoded by an M-sequence discrete spread spectrum technique to distinguish the ultrasonic wave from those transmitted by the other ultrasonic measuring apparatuses. However, even if the wave is encoded by the M-sequence discrete spread spectrum technique, the greater the magnitude of overlap between the ultrasonic wave in question and those transmitted by the other ultrasonic measuring apparatuses, the greater the degree of interference due to the cross-correlation. As the interference increases, the peak value of the correlation values decreases, thus making it impossible to determine the exact time of reception of the ultrasonic wave. As a result, the distance could not be measured accurately anymore. Also, if the overlap between the ultrasonic wave in question and those transmitted by the other ultrasonic measuring apparatuses became too great, then no correlation peak value could be obtained any longer and even no measurements could be done at all.

Furthermore, to extract the only transmitted signal by eliminating the other signals in an environment in which the transmitted signal and the other signals interfere with each other, in the field of radio communications, the profile of the propagation path is estimated in advance and used to eliminate the interfering signals as in the interference canceller disclosed in Patent Document No. 2. The profile of the propagation path for the interfering signals could be estimated in this manner in the field of radio communications when the base station of cellphones is going receive radio waves, for example, because the profile of the interfering signals is substantially determined by geography. Actually, however, ultrasonic measuring apparatuses are used in various other environments, too, and therefore, it is difficult to predict the effect of the interfering ultrasonic waves in advance.

In order to overcome at least one of these problems of the prior art, the present invention has an object of providing an ultrasonic measuring apparatus and ultrasonic measuring method that can measure the distance accurately even in an environment where there are a number of other ultrasonic measuring apparatuses.

Means for Solving the Problems

An ultrasonic measuring method according to the present invention is a method for estimating at least one of the propagation distance and the propagation azimuth of a desired ultrasonic wave, which is one of a number of ultrasonic waves that have been transmitted by a spread spectrum technique using mutually different codes. The method includes the steps of: (A1) receiving the ultrasonic waves, which have been transmitted by the spread spectrum technique using the mutually different codes, at first and second receivers, thereby generating first and second received signals, respectively; (B1) despreading the first and second received signals with a code that has been used to spread any of the ultrasonic waves other than the desired one, thereby generating at least one despread signal; (C1) extracting a plurality of signals, of which the amplitudes are equal to or greater than respective threshold values, from the despread signal using the threshold values, thereby generating mutually different interference signals for the respective threshold values; (D1) spreading the interference signals with the code that has been used to spread the ultrasonic wave other than the desired one and then removing the interference signals from the first and second received signals, thereby generating first and second received signals, from which the interference signals have been removed, for the respective threshold values; (E1) despreading the first and second received signals, from which the interference signals have been removed, with the code of the desired ultrasonic wave, thereby generating first and second despread received signals, from which the interference signals have been removed, for the respective threshold values; (F1) calculating maximum correlation values between the first and second despread received signals for the respective threshold values; (G1) determining at which of the threshold values the greatest one of the maximum correlation values has been obtained; and (H1) calculating at least one of the propagation distance and the propagation azimuth of the desired ultrasonic wave by the amount of time it has taken for the first and second despread received signals, associated with the threshold value determined, to reach the first and second receivers.

In one preferred embodiment, using a plurality of preset threshold values, the steps (C1) through (F1) are performed on the respective threshold values in parallel with each other.

Another ultrasonic measuring method according to the present invention is also a method for estimating at least one of the propagation distance and the propagation azimuth of a desired ultrasonic wave, which is one of a number of ultrasonic waves that have been transmitted by a spread spectrum technique using mutually different codes. The method includes the steps of: (A2) receiving the ultrasonic waves, which have been transmitted by the spread spectrum technique using the mutually different codes, at first and second receivers, thereby generating first and second received signals, respectively; (B2) despreading the first and second received signals with a code that has been used to spread any of the ultrasonic waves other than the desired one, thereby generating at least one despread signal; (C2) extracting a signal, of which the amplitude is equal to or greater than a threshold value, from the despread signal using the threshold value, thereby generating an interference signal; (D2) spreading the interference signal with the code that has been used to spread the ultrasonic wave other than the desired one and then removing the interference signal from the first and second received signals, thereby generating first and second received signals, from which the interference signal has been removed; (E2) despreading the first and second received signals, from which the interference signal has been removed, with the code of the desired ultrasonic wave, thereby generating first and second despread received signals, from which the interference signal has been removed; (F2) calculating a maximum correlation value between the first and second despread received signals; (G2) performing the steps (B2) through (F2) with the threshold values changed; (H2) repeatedly performing the step (G2) until a difference between the maximum correlation value and its previous value becomes equal to or smaller than a predetermined value; and (I2) calculating at least one of the propagation distance and the propagation azimuth of the desired ultrasonic wave by the amount of time it has taken for the first and second despread received signals, associated with the threshold value at which the difference between the maximum correlation value and its previous value becomes equal to or smaller than the predetermined value, to reach the first and second receivers.

In one preferred embodiment, the step (H2) includes determining the threshold value by the difference between the maximum correlation value and its previous value.

In another preferred embodiment, the codes are M-sequence pseudo spread codes.

In still another preferred embodiment, 0 and 180 degree phases of the ultrasonic waves are allocated to the codes.

In yet another preferred embodiment, the maximum correlation value between the first and second despread received signals is calculated by finding correlation between complex numbers.

An ultrasonic measuring apparatus according to the present invention is designed to estimate at least one of the propagation distance and the propagation azimuth of a desired ultrasonic wave, which is one of a number of ultrasonic waves that have been transmitted by a spread spectrum technique using mutually different codes. The apparatus includes: first and second receivers for receiving the ultrasonic waves, which have been transmitted by the spread spectrum technique using the mutually different codes, thereby generating respective received signals; and first and second interference canceling sections that are connected to the first and second receivers. The canceling sections despread the received signals with a code that has been used to spread any of the ultrasonic waves other than the desired one, thereby generating at least one despread signal, extract a plurality of signals, of which the amplitudes are equal to or greater than respective threshold values, from the despread signal using the threshold values, thereby generating mutually different interference signals for the respective threshold values, spread the interference signals with the code that has been used to spread the ultrasonic wave other than the desired one and then remove the interference signals from the received signals, thereby generating received signals, from which the interference signals have been removed, for the respective threshold values and despread the received signals, from which the interference signals have been removed, with the code of the desired ultrasonic wave, thereby generating despread received signals, from which the interference signals have been removed, for the respective threshold values. The apparatus further includes a correlating section for calculating maximum correlation values between the despread received signals, which have been generated by the first and second interference canceling sections and from which the interference signals have been removed, for the respective threshold values; a selecting section for selecting one of the threshold values at which the greatest one of the maximum correlation values for the respective threshold values has been obtained; and a distance/azimuth calculating section for calculating at least one of the propagation distance and the propagation azimuth of the desired ultrasonic wave by the amount of time it has taken for the despread received signals, which are associated with the threshold value selected and from which the interference signals have been removed, to reach the first and second receivers.

In one preferred embodiment, by using a plurality of preset threshold values, the first and second interference canceling sections generate the despread received signals, from which the interference signals have been removed, for the respective threshold values.

Another ultrasonic measuring apparatus according to the present invention is also designed to estimate at least one of the propagation distance and the propagation azimuth of a desired ultrasonic wave, which is one of a number of ultrasonic waves that have been transmitted by a spread spectrum technique using mutually different codes. The apparatus includes: first and second receivers for receiving the ultrasonic waves, which have been transmitted by the spread spectrum technique using the mutually different codes, thereby generating respective received signals; a threshold value changing section for updating and sequentially generating threshold values in accordance with an instruction; and first and second interference canceling sections that are connected to the first and second receivers. The canceling sections despread the received signals with a code that has been used to spread any of the ultrasonic waves other than the desired one every time the threshold value is updated, thereby generating at least one despread signal; extract a signal, of which the amplitude is equal to or greater than a threshold value, from the despread signal using the threshold value, thereby generating an interference signal; spread the interference signal with the code that has been used to spread the ultrasonic wave other than the desired one and then remove the interference signal from the received signals, thereby generating received signals, from which the interference signal has been removed; despread the received signals, from which the interference signal has been removed, with the code of the desired ultrasonic wave, thereby generating despread received signals, from which the interference signal has been removed. The apparatus further includes a correlating section for calculating a maximum correlation value between the despread received signals, which have been generated by the first and second interference canceling sections and from which the interference signal has been removed, for the respective threshold values; a correlation peak value determining section for calculating a difference between the maximum correlation value and its previous value and instructing the threshold value changing section to select the threshold value if the difference is equal to or smaller than a predetermined value and to update the threshold value if the difference is greater than the predetermined value; and a distance/azimuth calculating section for calculating at least one of the propagation distance and the propagation azimuth of the desired ultrasonic wave by the amount of time it has taken for the despread received signals, which are associated with the threshold value selected and from which the interference signal has been removed, to reach the first and second receivers.

In one preferred embodiment, the correlation peak value determining section instructs the threshold value changing section to change the threshold values according to the difference between the maximum correlation value and its previous value.

In another preferred embodiment, the codes are M-sequence pseudo spread codes.

In still another preferred embodiment, 0 and 180 degree phases of the ultrasonic waves are allocated to the codes.

In yet another preferred embodiment, the correlating section calculates the maximum correlation value between the first and second despread received signals by finding correlation between complex numbers.

EFFECTS OF THE INVENTION

According to the present invention, even in an environment where there are a number of ultrasonic measuring apparatuses, the distance can also be measured accurately by canceling their mutual interference in the best way.

In addition, by extracting interference signals from a waveform that has been despread with a code other than the desired one with respect to a threshold value that has been determined by the correlation value between the received signals received at a plurality of receivers, directly spreading the extracted signals, and then removing them from the received signals, the interference signal removing process can be carried out accurately without using the profile of the propagation path.

BRIEF DESCRIPTION OF DRAWINGS

FIG. 11 shows the waveforms of interference signals that have been extracted by the extracting sections 23 with respect to the threshold value 42C.

FIGS. 20(a) through 20(d) show the results of an experiment carried out on the first preferred embodiment as waveforms yet to be despread.

FIGS. 21(a), 21(b) and 21(c) show despread ones of the waveforms shown in FIGS. 20(a), 20(c) and 20(d), respectively.

DESCRIPTION OF REFERENCE NUMERALS

Figure 1:
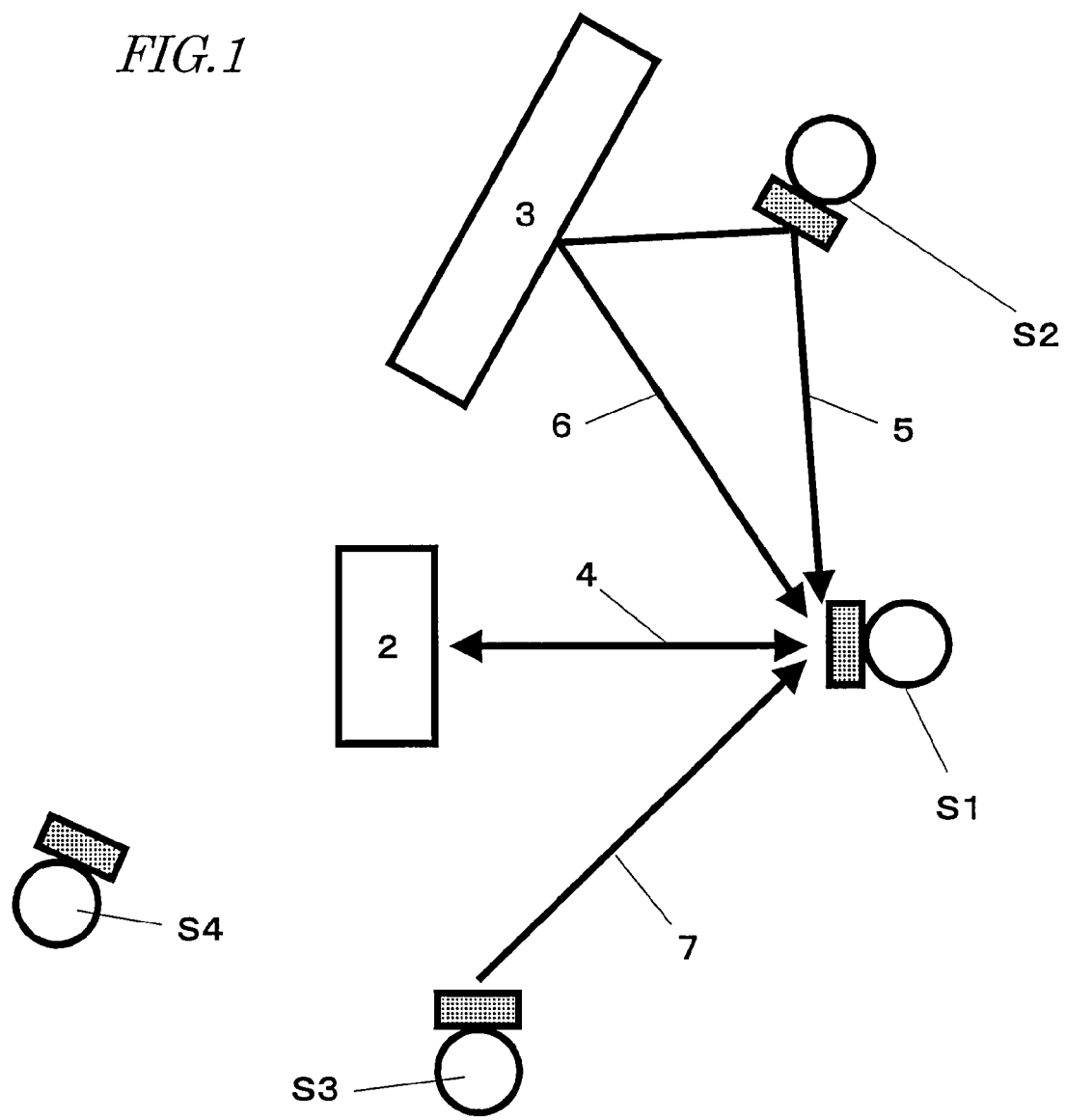
FIG. 1 shows a typical environment in which an ultrasonic measuring apparatus according to the present invention is used.

S1, S2, S3, S4 ultrasonic measuring apparatus
2 object
3 wall
4, 5, 6, 7 ultrasonic wave propagation path
8 transmitter
9 receiver
10 computing section
11 best interference canceling processor
12 distance/azimuth calculator
13 transmitting section
14 receiving section
15 storage section
16 window setting section
17 interference canceling section
18 correlating section
19 correlation peak value comparing section
20 selecting section
21 despreading section
22 demodulating section
23 extracting section
24 spreading section
25 delay section
26 adder
27 despreading section
28 storage section
30 spread code
31 modulated wave
32 received data
80 threshold value changing section
81 correlation peak value determining section
102 conventional ultrasonic measuring apparatus
103 correlator
104 peak detector
105 pulse generator
106 interference canceller block
107 demodulation processing section
108 delay processing section
109 interference canceling section
110 received input signal
111 despreading block
112 despreading section
113 complex conjugating section
114 propagation path estimating section
115 multiplier
116 decision section
117 spreading block
118 spreading section
119 multiplier

BEST MODE FOR CARRYING OUT THE INVENTION

EMBODIMENT 1

Hereinafter, a First Preferred Embodiment of an ultrasonic measuring apparatus and ultrasonic measuring method according to the present invention will be described with reference to the accompanying drawings.

The ultrasonic measuring apparatus of the present invention estimates at least one of the propagation distance and propagation azimuth of a desired ultrasonic wave, which is included in a plurality of ultrasonic waves. FIG. 1 shows an environment in which there are a number of ultrasonic measuring apparatuses.

An ultrasonic measuring apparatus S1 sends out an ultrasonic wave toward an object 2 through a propagation path 4 and then receives the wave that has been reflected by the object 2, thereby measuring the length of the propagation path 4, or the distance from the object 2 to the ultrasonic measuring apparatus S1 itself. The ultrasonic measuring apparatus S1 can also determine the azimuth of the object 2 as viewed from the ultrasonic measuring apparatus S1.

Meanwhile, ultrasonic measuring apparatuses S2 and S3 are also measuring the distances or determining the azimuths by transmitting and receiving ultrasonic waves. Also, the ultrasonic wave transmitted by the ultrasonic measuring apparatus S2 reaches the ultrasonic measuring apparatus S1 through a propagation path 5. There is another propagation path 6 for an ultrasonic wave that reaches the ultrasonic measuring apparatus S1 after having been reflected from a wall 3. In the same way, the ultrasonic wave transmitted by the ultrasonic measuring apparatus S3 reaches the ultrasonic measuring apparatus S1 through a propagation path 7. But there is no propagation path for the ultrasonic wave, transmitted from an ultrasonic measuring apparatus S4, to reach the ultrasonic measuring apparatus S1.

These four ultrasonic measuring apparatuses S1, S2, S3 and S4 are operating independently of each other. And none of these ultrasonic measuring apparatuses transmits or receives information about the operation of any of the other apparatuses.

Hereinafter, the ultrasonic measuring apparatus S1 will be described as a preferred embodiment of the present invention. In this preferred embodiment, the ultrasonic measuring apparatus S1 includes a transmitter for sending out an ultrasonic wave and a driving section for driving the transmitter. Alternatively, the ultrasonic measuring apparatus S1 may include no transmitter and no driving section but may measure the distance from another ultrasonic measuring apparatus, which is independent of the apparatus S1, to itself or determine the azimuth of that another ultrasonic measuring apparatus by receiving an ultrasonic wave from that apparatus.

The ultrasonic waves sent out by the ultrasonic measuring apparatuses S1 through S4 shown in FIG. 1 have been encoded with mutually different M-sequence codes and transmitted by the spread spectrum technology. As a modulation method for encoding, binary phase shift keying, in which "1" of the spread code is associated with a sine wave of 100 kHz or less and "0" of the spread code is associated with a sine wave of 100 kHz or less having had its phase inverted by 180 degrees, is used. It should be noted that this sine wave of 100 kHz or less will be referred to herein as a "carrier".

The number of sine waves included within a single spread code is preferably determined by the bandwidths of the transmitter and receiver used. That is to say, if the bandwidth is narrow, the wave number is increased. Otherwise, the wave number is decreased. The smaller the wave number, the higher the rate of the spread spectrum and the higher the noise resistance. Also, the greater the order of an M-sequence (i.e., the length of the M-sequence), the lower the degree of correlation with the other M-sequences. Therefore, the greater the order of an M-sequence, the smaller the interference noise and the better. However, as the order increases, the ultrasonic wave to transmit becomes longer and is affected more easily by variations in the environment.

Taking these points into account, in an environment in which there are at most four ultrasonic measuring apparatuses, for example, a seventh order M-sequence is preferably used. On the other hand, in an environment in which there are at most ten ultrasonic measuring apparatuses, a ninth order M-sequence is preferably used. In this manner, the length of the M-sequence is preferably changed according to the number of the ultrasonic measuring apparatuses that are present in the same environment. For example, if the seventh order M-sequence is used in a situation where the carrier has a frequency of 40 kHz and there is only one sine wave within the same code, the ultrasonic wave to transmit will have a length of about 3 ms.

Figure 2A:
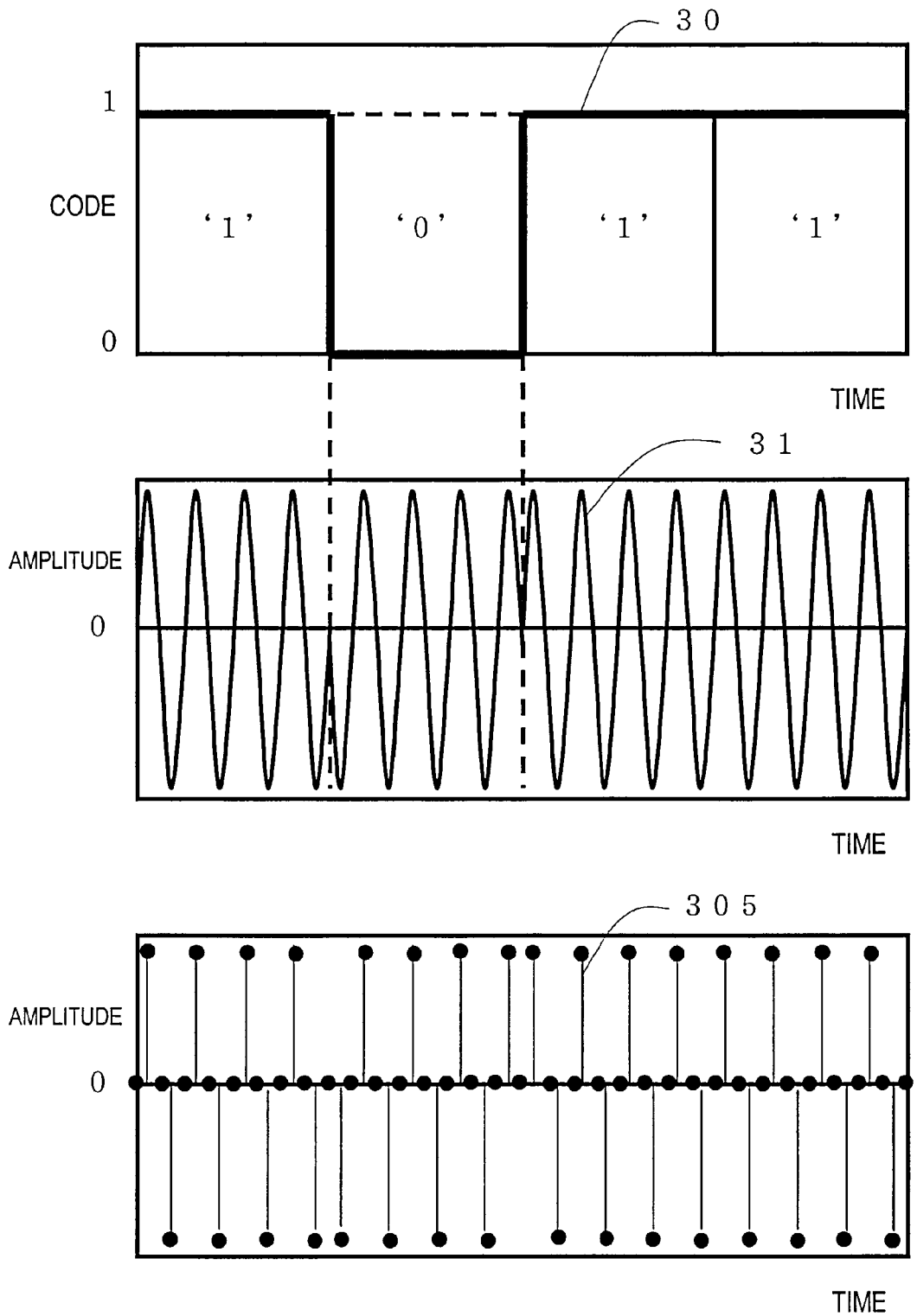
FIG. 2A shows the concept of binary phase shift keying adopted in the present invention.

FIG. 2A shows the concept of the binary phase shift keying. For example, if a sine wave carrier is spread by the binary phase shift keying using a spread code 30 represented as "1, 0, 1, 1", a waveform 31 is obtained. In the waveform 31, the phase is inverted at each boundary between bits "0" and "1".

Figure 2B:
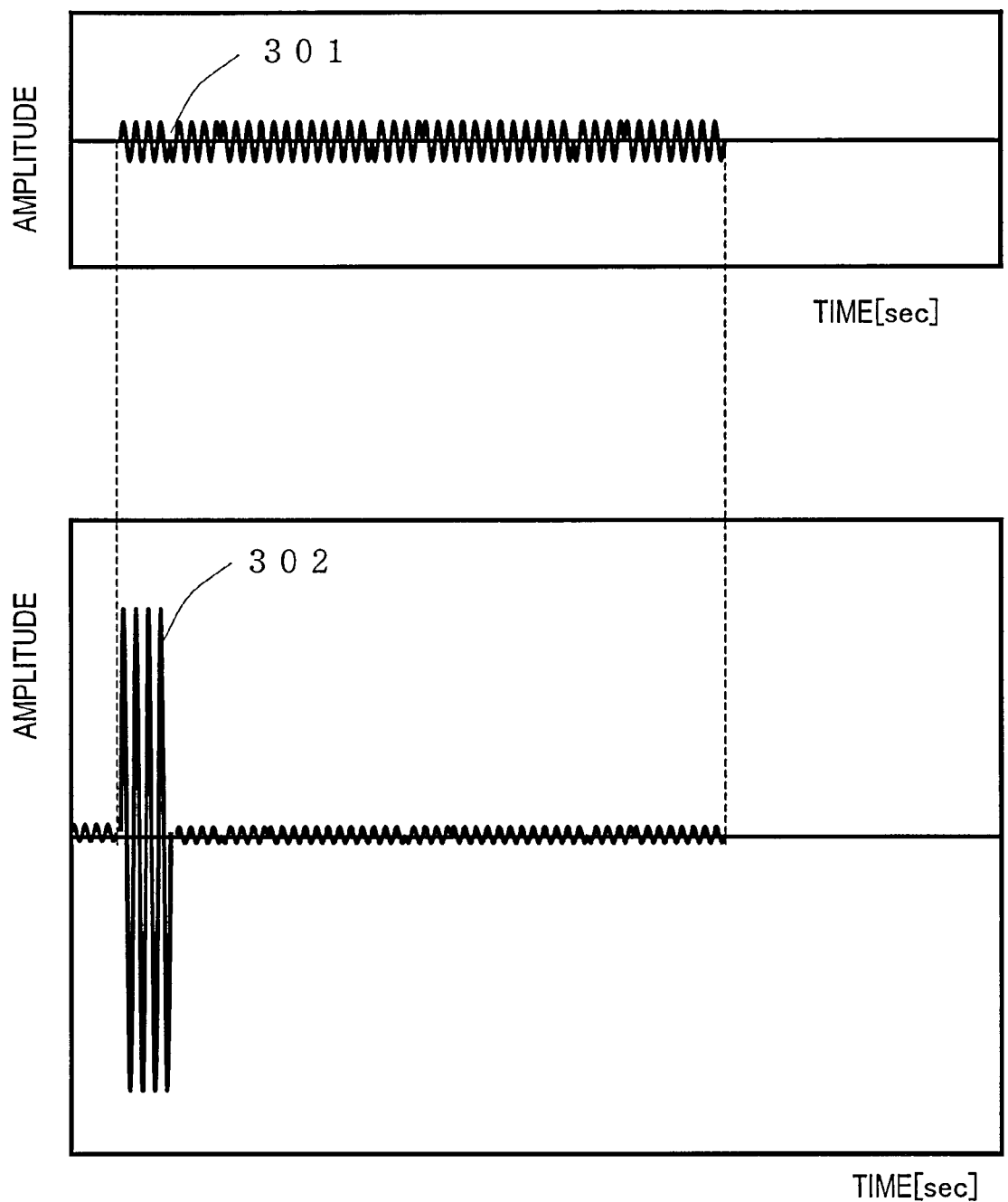
FIG. 2B shows a waveform obtained by despreading a spread signal.

FIG. 2B shows a waveform 301 as an exemplary signal that has been spread by the binary phase shift keying using the M-sequence spread code. If the waveform 301 is despread using the same spread code, then a waveform 302 is obtained. But if the code used for spreading and the code used for despreading are different from each other, then these waveforms will not appear. That is why if the ultrasonic measuring apparatuses S1 through S4 shown in FIG. 1 spread ultrasonic waves to transmit with mutually different spread codes and despread the received waves with their own spread codes, each of those apparatuses can extract only the waveform that has been transmitted by itself.

Figure 2C:
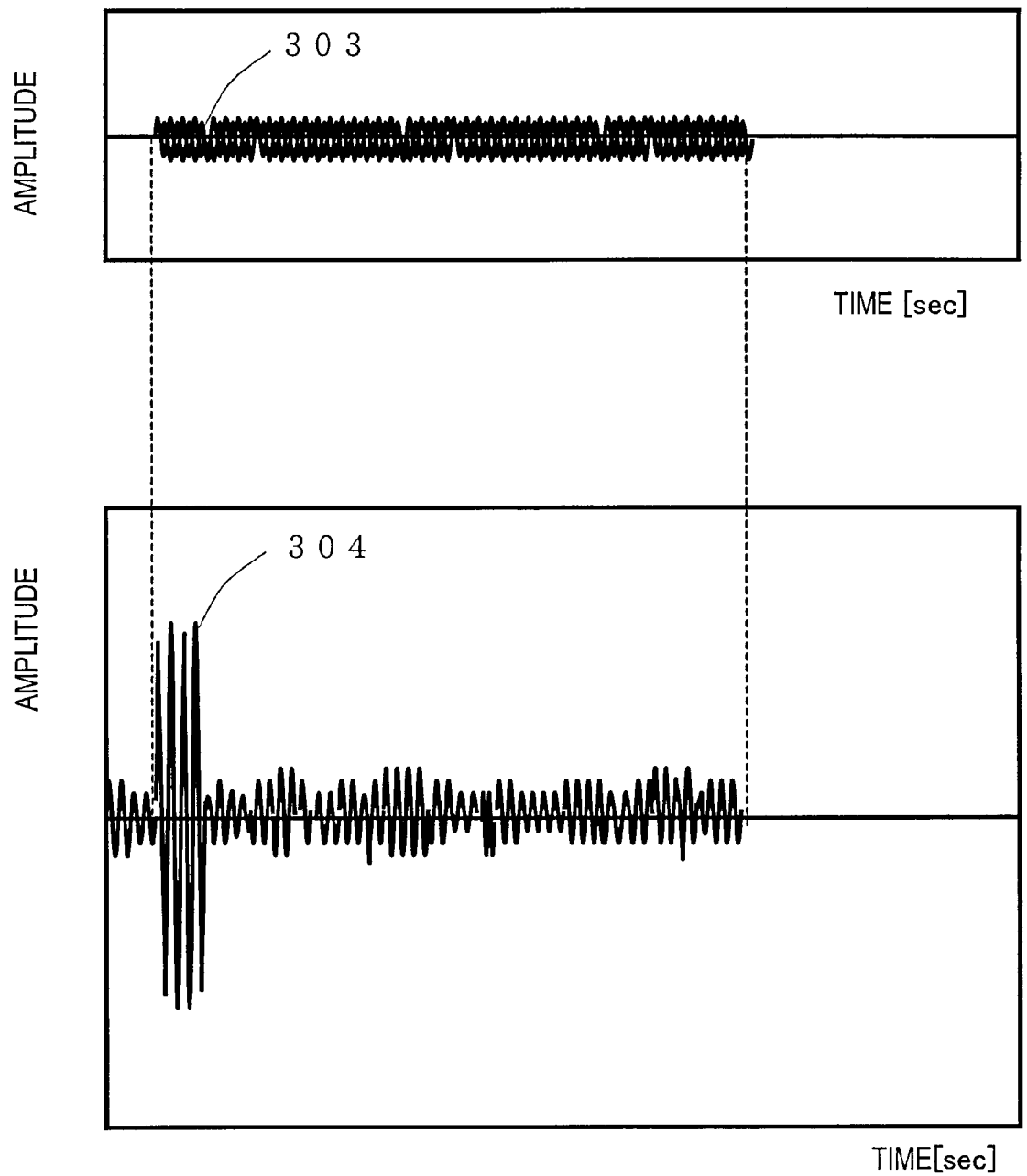
FIG. 2C shows a waveform obtained by despreading a spread signal on which an interfering wave has been superposed.

FIG. 2C shows the waveform 303 of a signal that is interfered with by a signal that has been spread with a different code. By despreading the waveform 303 with a proper spread code, not the code of the interfering signal, a waveform 304 can be obtained. Comparing this waveform 304 to the waveform 302 shown in FIG. 2B, it can be seen that the amplitude ratio of the extracted signal to its noise portions (i.e., the relative magnitude of the amplitude) has decreased. The greater the number of interfering signals, the lower this amplitude ratio.

The reason is that as the spread codes are not quite random, there is some cross-correlation even between different codes and amplitude components of interfering signals superpose one upon the other according to the correlation value.

In the waveform 303, the amplitude of the interfering signal is almost as large as that of the signal in question. However, if the amplitude of the interfering signal is greater than that of the signal to extract, then the noise portions will have even greater amplitude, thus making it difficult to extract the desired signal.

In the environment shown in FIG. 1, the ultrasonic wave used by the ultrasonic measuring apparatus S1 to measure the distance to the object 2 or determine its azimuth is reflected by the object 2 to return to the ultrasonic measuring apparatus S1 through the propagation path 4. On the other hand, the ultrasonic waves reaching the ultrasonic measuring apparatus S1 from the ultrasonic measuring apparatuses S2 and S3 through the propagation paths 5 and 7, respectively, both arrive at the ultrasonic measuring apparatus S1 directly. That is why the ultrasonic waves that have come from the ultrasonic measuring apparatuses S2 and S3 and have been received as interfering signals have higher energy than the ultrasonic wave to be transmitted by the ultrasonic measuring apparatus S1. Consequently, unless these ultrasonic waves are removed, it is difficult for the ultrasonic measuring apparatus S1 to accurately estimate the propagation time of the ultrasonic wave transmitted.

The ultrasonic measuring apparatus of the present invention generates a received signal, which is not affected by interference, by canceling those interfering signals and can accurately estimate the distance or the azimuth by exactly measuring the propagation time of the ultrasonic wave using the received signal thus obtained.

Figure 3:
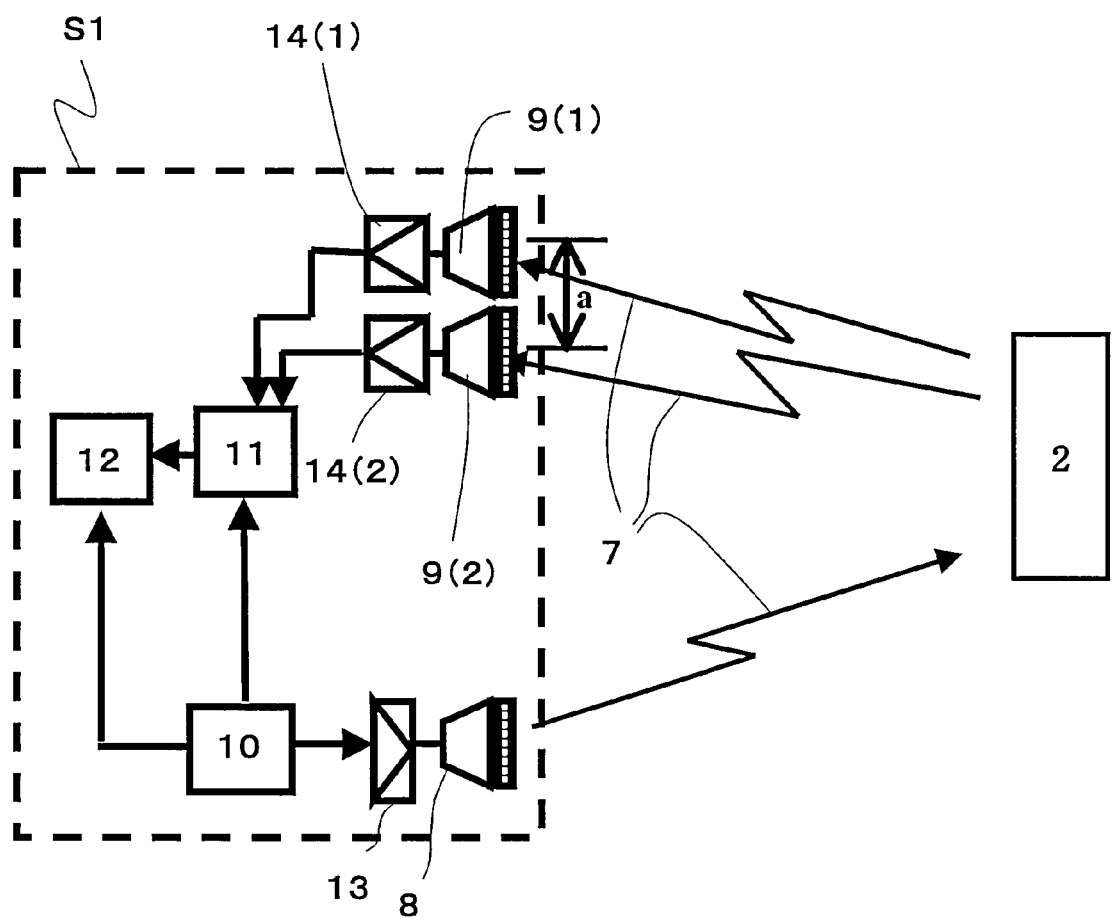
FIG. 3 is a block diagram showing the basic configuration of an ultrasonic measuring apparatus according to a first preferred embodiment of the present invention.

FIG. 3 is a block diagram showing the basic configuration of the ultrasonic measuring apparatus S1 of the present invention. The ultrasonic measuring apparatus includes a transmitter 8, a first receiver 9(1), a second receiver 9(2), a computing section 10, a best interference canceling processor 11, a distance/azimuth calculator 12, a transmitting section 13, a first receiving section 14(1) and a second receiving section 14(2). The best interference canceling processor 11 and other components of the ultrasonic measuring apparatus or some of their functions may be realized by means of software. The first and second receivers 9(1) and 9(2) are arranged adjacent to each other with a gap a left between them.

If the maximum measuring distance (i.e., the measuring limit) of the ultrasonic measuring apparatus is set within the range of 5 m to 10 m, the frequency of ultrasonic waves to use may be determined with that maximum measuring distance and the attenuation characteristic of the ultrasonic waves in the air taken into consideration. The higher the frequency of the ultrasonic waves, the shorter their wavelength and the higher the time resolution achieved during the propagation time measurement. However, the higher the frequency, the greater the degree of attenuation of the ultrasonic waves in the air, too. If the maximum measuring distance is defined to be 5 m, for example, to drive the transmitter 8 and the receiver 9 just as intended, then ultrasonic waves with a frequency of 100 kHz or less are preferred. In this preferred embodiment, ultrasonic waves with a frequency of 40 kHz are used for measurements.

The transmitter 8 and the receiver 9 may use either ultrasonic vibrators, which are flexible vibrators made of a piezoelectric ceramic, or vibrators including a PVDF piezoelectric polymer film. The first and second receivers 9(1) and 9(2) are arranged adjacent to each other with a gap a left between them. If the maximum measuring distance is 5 m, then the gap a is preferably a half or less of the wavelength of the ultrasonic waves (e.g., 8.5 mm for 40 kHz). As long as ultrasonic vibrators compliant with the same standard are used as the first and second receivers 9(1) and 9(2), difference in characteristic between the receivers will hardly affect the measuring accuracy.

The computing section 10 may be implemented as a microcomputer, for example, to generate a drive signal and control the best interference canceling processor 11 and the distance/azimuth calculator 12. An exemplary drive signal generated by the computing section 10 is shown as the waveform 305 in FIG. 2A. The drive signal generated by the computing section 10 has a pulse waveform and has been subjected to spread processing with the M-sequence spread code 30. The sampling rate of the drive signal generated by the computing section 10 is supposed to be four times as high as the carrier frequency. Drive is carried out at the peak of amplitude of the random wave 31 that has been spread with the spread code 30.

The drive signal is output from the computing section 10 to the transmitter 8, which is driven responsive to the drive signal so as to transmit an ultrasonic wave.

The first and second receivers 9(1) and 9(2) receive the ultrasonic waves that have been reflected by the object 2 and transduce the received ultrasonic waves into electrical received signals. The first and second receiving sections 14(1) and 14(2) amplify those received signals and make A/D conversion on them. The sampling frequency of the A/D conversion is preferably at least four times as high as the carrier frequency.

The best interference canceling processor 11 gets a first received signal from the first receiving section 14(1) and generates an interference signal to remove based on the first received signal. In this preferred embodiment, the interference signal includes signal components of the ultrasonic waves that have been transmitted from the ultrasonic measuring apparatuses S2 and S3. By removing the generated interference signal from the first received signal, only the ultrasonic wave transmitted by the ultrasonic measuring apparatus S1 is obtained as the first received signal. In the same way, the best interference canceling processor 11 gets a second received signal from the second receiving section 14(2), generates an interference signal to remove, and then removes the generated interference signal from the second received signal. In this manner, first and second interference-free signals can be obtained.

As for to what degree the first and second interference-free received signals are reproducing only the ultrasonic wave transmitted from the transmitter 8 of the ultrasonic measuring apparatus S1, it depends on how accurately the interference signals to remove have been generated.

According to the present invention, interference signals are generated under mutually different conditions, first and second interference-free received signals are generated on a condition-by-condition basis, correlation between the first and second interference-free received signals is figured out on a condition by condition basis again, and first and second interference-free received signals obtained at the highest correlation value are selected.

The receivers 9(1) and 9(2) are arranged adjacent to each other and may be regarded as being located in substantially the same environment. That is why the waveforms of the ultrasonic waves received by the receivers 9(1) and 9(2) are ideally identical with each other. Consequently, the more accurate the waveform of the interference signal generated, the more closely the resultant waveforms of the first and second interference-free received signals would agree with each other and the higher the degree of correlation between the first and second received signals would be.

The distance/azimuth calculator 12 gets the first and second interference-free received signals thus selected and figures out the times when the ultrasonic waves arrived at the first and second receivers 9(1) and 9(2). Then, the calculator 12 calculates the difference between the arrival times and the amount of time it has passed since the waves started to be transmitted, thereby estimating the distance to the object 2 and its azimuth.

Hereinafter, it will be described with reference to FIG. 4 generally how the ultrasonic measuring apparatus S1 of the present invention operates. As described above, first, the ultrasonic measuring apparatus S1 receives an ultrasonic wave and generates a received signal in Step S11. Next, the apparatus S1 generates an interference signal based on the received signal in Step S12.

As described above, when the spread spectrum technology is adopted, only desired signals components can be extracted from even mutually interfering signals by despreading them with a spread code. That is to say, if the extra signals to remove are despread with the spread code that was used to spread those extra signals, only the extra signals to remove can be either generated or extracted from the received signals. However, if a lot of signals are interfering with each other as already described with reference to FIG. 2C, their noise components will just have increased amplitudes even when the signals are despread. For that reason, according to the present invention, a threshold value is set so as to prevent those noise components from being included in the interference signal. In that case, several threshold values are preferably set.

Next, the interference signal is removed from the received signal in Step S13. The degree of correlation between the first and second received signals, from which the interference signals have been removed, is calculated for each of the multiple threshold values, thereby evaluating the degree of reproducibility of the interference signals. In this preferred embodiment, a plurality of interference signals are generated using a plurality of threshold values that have been determined in advance, the degree of correlation between the first and second received signals, from which their interference signals have been removed, is calculated, and first and second received signals with the highest degree of correlation are selected. Then, the distance or azimuth is estimated in Step S15 using the first and second received signals selected.

The threshold values may be set by generating a plurality of interference signals in Step S12 using a plurality of threshold values that have been determined in advance, calculating the degrees of correlation between the first and second interference-free received signals in Step S14 for the respective threshold values in parallel, and selecting the first and second interference-free received signals with the highest degree of correlation. In this preferred embodiment, an ultrasonic measuring apparatus that adopts this procedure will be described.

Figure 4:
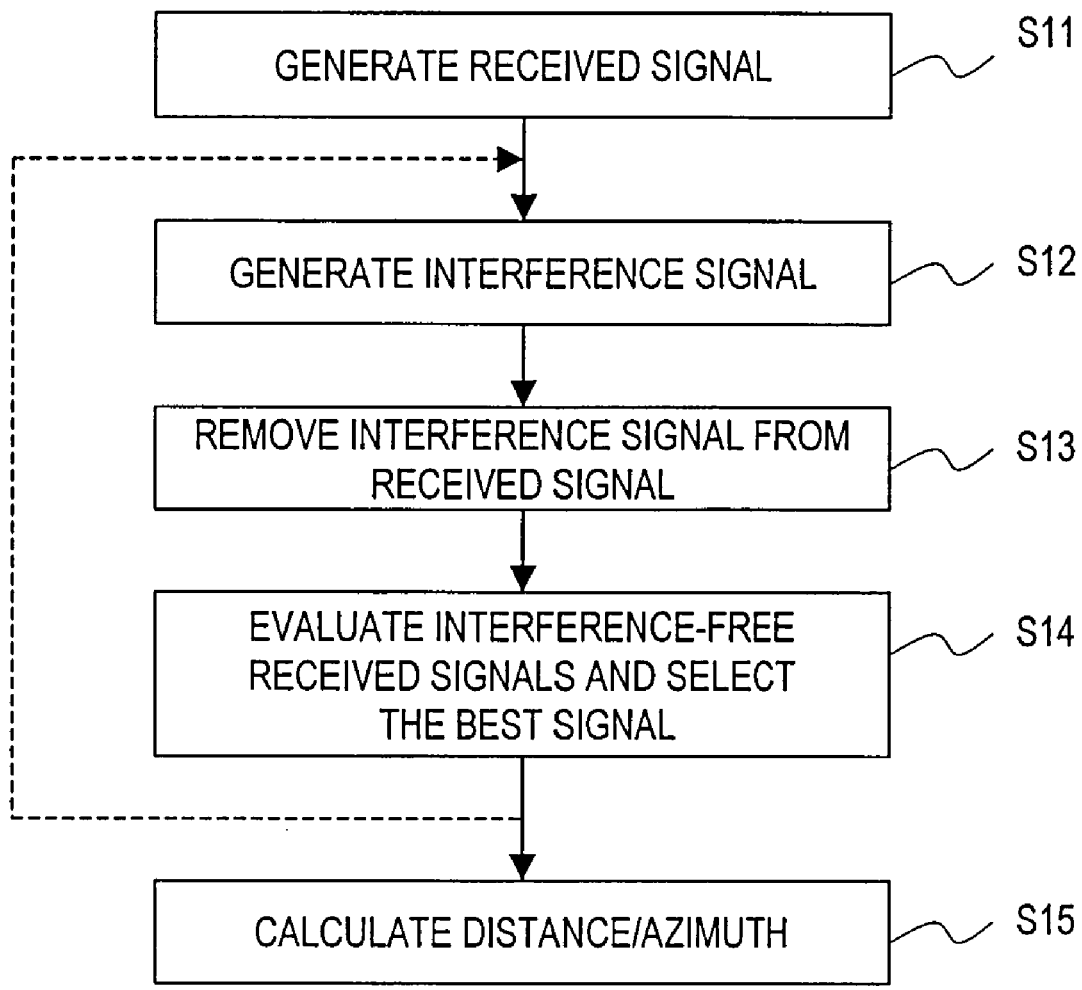
FIG. 4 is a flowchart showing a general procedure of an ultrasonic measuring method according to the present invention.

Alternatively, as indicated by the dashed line in FIG. 4, the best threshold value may be searched for by repeatedly performing the processing steps S12 to S14 (i.e., by calculating the degree of correlation between the first and second interference-free received signals while sequentially generating threshold values). An ultrasonic measuring apparatus that adopts such an alternative procedure will be described later as a second preferred embodiment of the present invention.

Hereinafter, the ultrasonic measuring apparatus and ultrasonic measuring method of this preferred embodiment will be described with the structure and operation of the best interference canceling processor 11 set forth particularly specifically.

Figure 5:
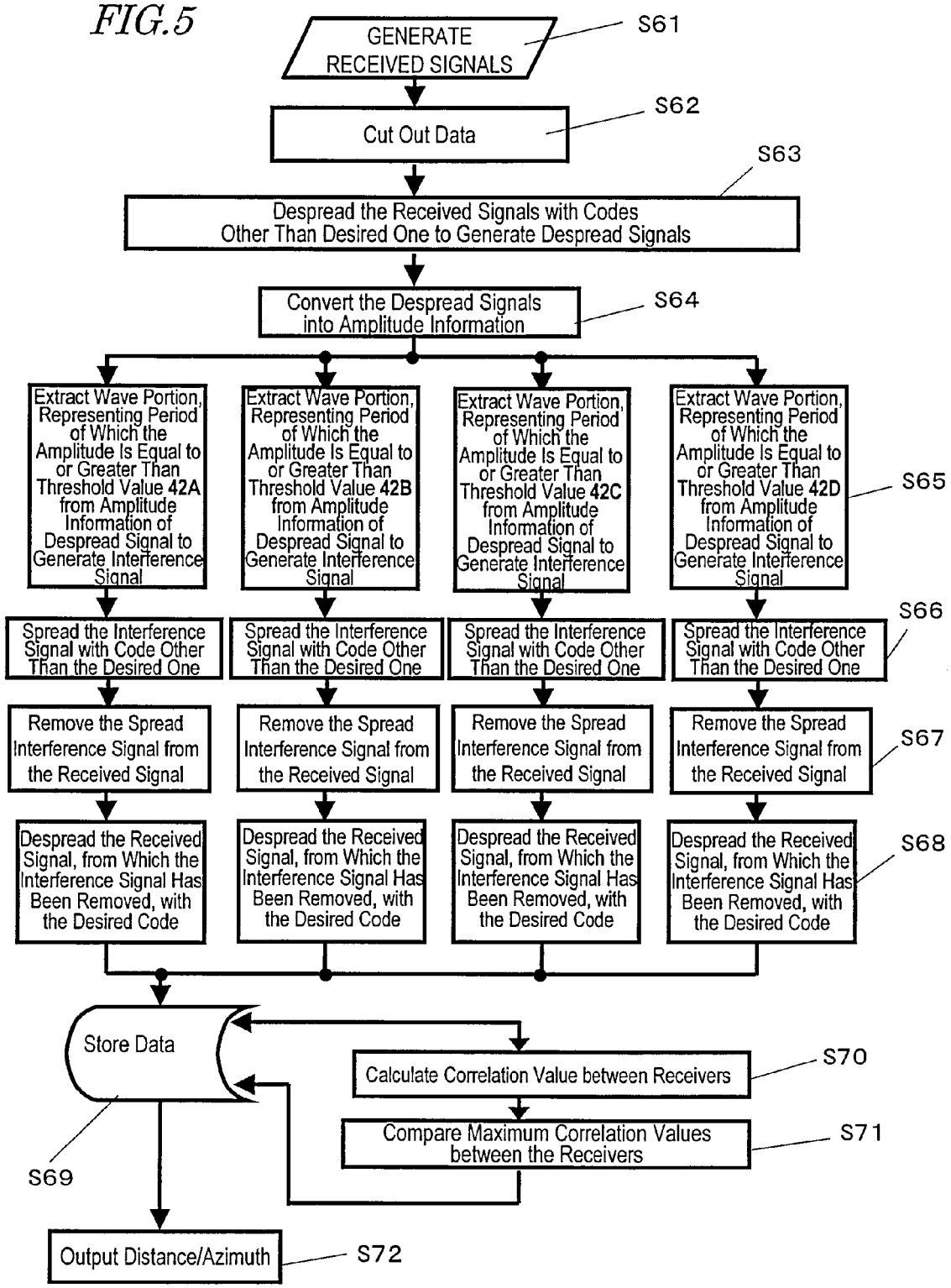
FIG. 5 is a flowchart showing a specific procedure of the ultrasonic measuring method of the first preferred embodiment.
Figure 6:
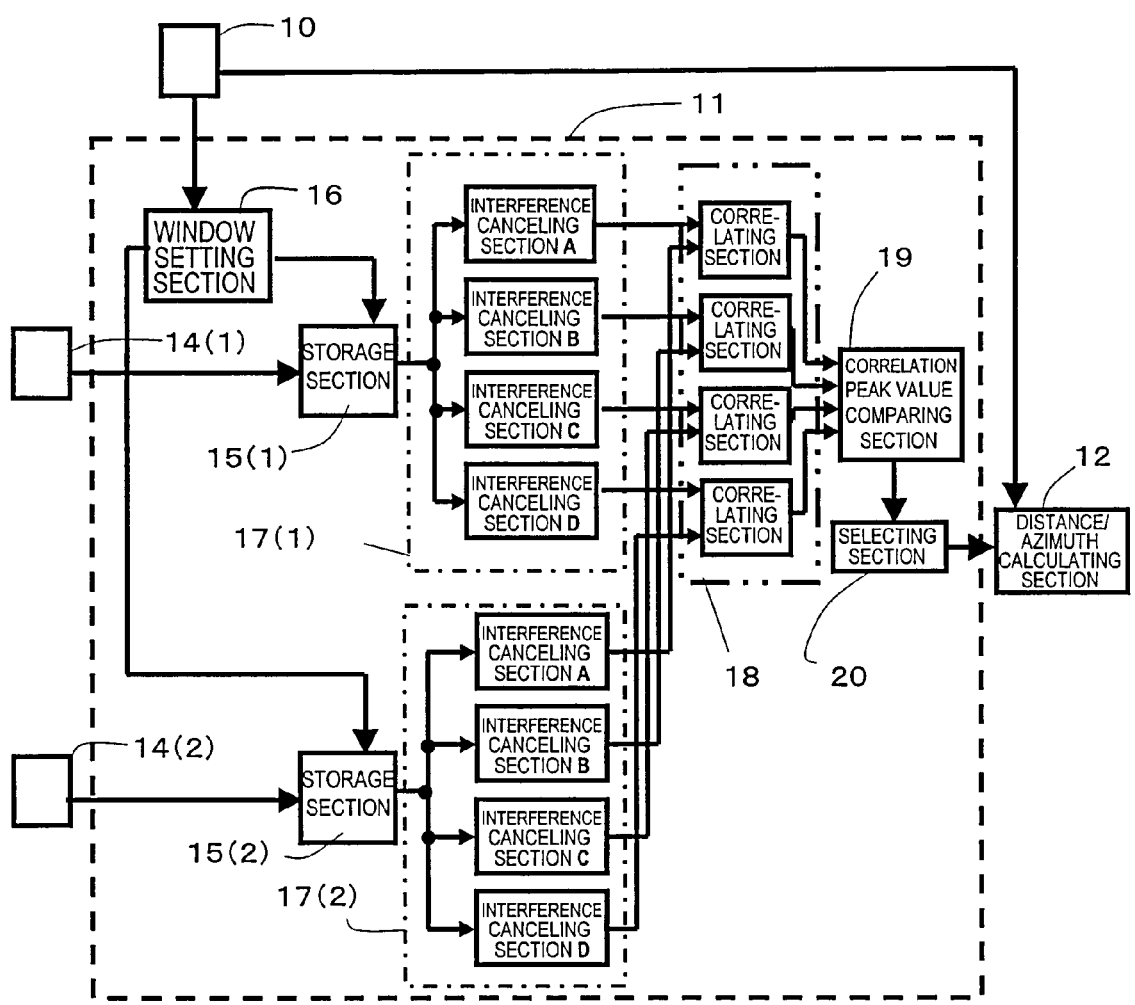
FIG. 6 is a block diagram showing the basic configuration of the best interference canceling processor 11 of the first preferred embodiment.

FIG. 5 is a flowchart showing the procedure to be performed after the first and second receiving sections 14(1) and 14(2) have generated the received signals and until the distance/azimuth calculator 12 estimates at least one of the distance and the azimuth. Also, FIG. 6 is a block diagram showing the basic configuration of the best interference canceling processor 11, which includes a first storage section 15(1), a second storage section 15(2), a window setting section 16, a first interference canceling unit 17(1), a second interference canceling unit 17(2), a correlating section 18, a correlation peak value comparing section 19, and a selecting section 20.

Each of the first and second interference canceling units 17(1) and 17(2) includes the same number of interference canceling sections as that of the threshold values that are set to generate the interference signals. In this preferred embodiment, to set four threshold values, each unit includes interference canceling sections A through D. The greater the number of the threshold values, the more accurately the interference signal can be reproduced. Nevertheless, as the number of threshold values increases, the computational complexity also increases. That is why an appropriate number of threshold values should be set in view of the computational performance of the best interference canceling processor 11.

Figure 7:
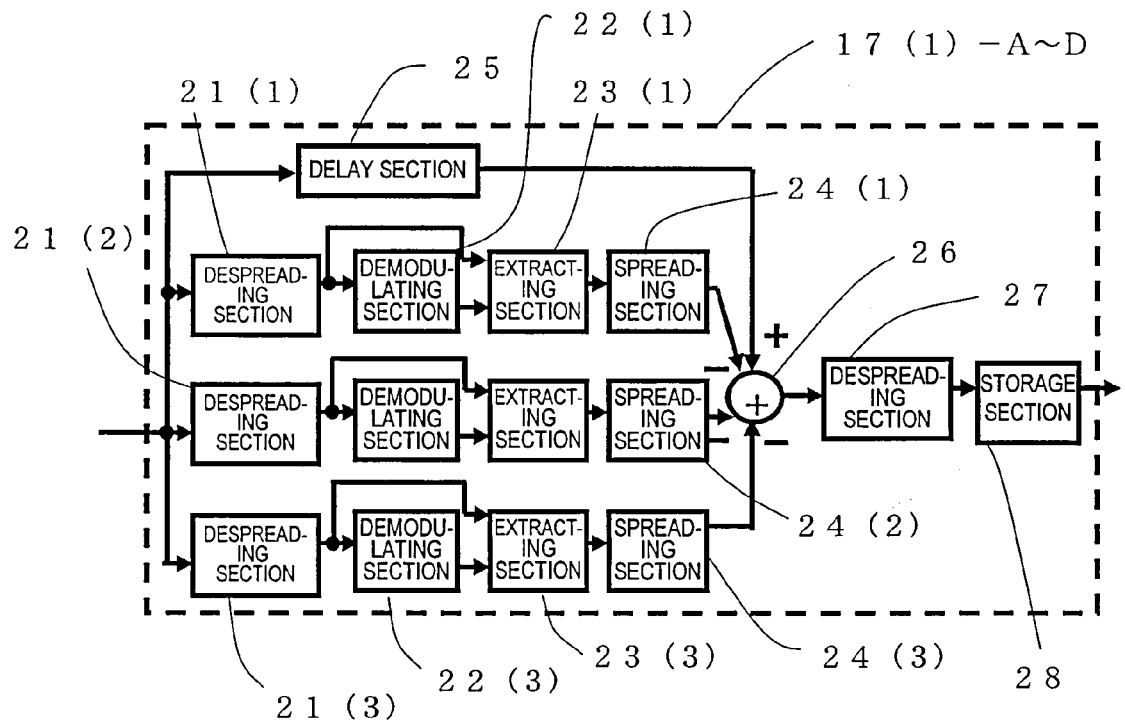
FIG. 7 is a block diagram showing the configuration of the interference canceling section 17 shown in FIG. 6.

FIG. 7 shows the structure of one of the interference canceling sections A through D that are included in the first interference canceling unit 17(1). Each of the interference canceling sections A through D includes despreading sections 21(1) through 21(3), demodulating sections 22(1) through 22(3), extracting sections 23(1) through 23(3), spreading sections 24(1) through 24(3), a delay section 25, an adder 26, a despreading section 27, and a storage section 28.

As shown in FIG. 1, in this preferred embodiment, the interference signals to remove are ultrasonic waves that can be transmitted from the ultrasonic measuring apparatuses S2, S3 and S4. That is why to generate three interference signals, three despreading sections 21(1) through 21(3), three demodulating sections 22(1) through 22(3), three extracting sections 23(1) through 23(3), and three spreading sections 24(1) through 24(3) are provided. Speaking more generally, in the environment in which the ultrasonic measuring apparatus S1 is used, the number of sets of these sections provided is preferably at least equal to that of the interference signals to encounter.

Hereinafter, the operation of the best interference canceling processor 11 will be described in detail step by step in the flowchart shown in FIG. 5 and with reference to FIGS. 3, 6 and 7, too.

(Step S61):

The processing step S61 corresponds to Steps A1 and A3. First, the first and second receivers 9(1) and 9(2) receive ultrasonic waves and the first and second receiving sections 14(1) and 14(2) amplify the received waves and perform A/D conversion on them, thereby generating received signals.

(Step S62):

The processing step S62 also corresponds to Steps A1 and A3. When a predetermined amount of time passes since the transmission start time that was set by the computing section 10, received data for that amount of time is cut out and gets stored in the first and second storage sections 15(1) and 15(2). The time to cut out the received data is set by the window setting section 16. Also, the time to cut out the received data is set based on the maximum measurable distance for the ultrasonic measuring apparatus and the wavelength of the ultrasonic wave for use in measuring.

For example, suppose the measurable range is from 1 m to 5 m. In that case, since an ultrasonic wave has an ultrasonic velocity of approximately 340 m/s in the air, the distances of 1 m and 5 m can be converted into propagation times of approximately 3 ms and approximately 15 ms, respectively. Also, if the carrier frequency is 40 kHz and the number of sine waves included in a single code is three, a seventh-order M-sequence will have a signal length of approximately 9.5 seconds. Consequently, the earliest possible arrival time T1 of the ultrasonic wave is 6 ms and the latest possible arrival time T2 of the ultrasonic wave is approximately 40 ms. For that reason, supposing the ultrasonic wave started to be transmitted at time zero, the window setting section 16 sets the window to cut out the received data such that the window includes the interval between the time T1 of 6 ms and the time T2 of 36.5 ms.

Figure 8:
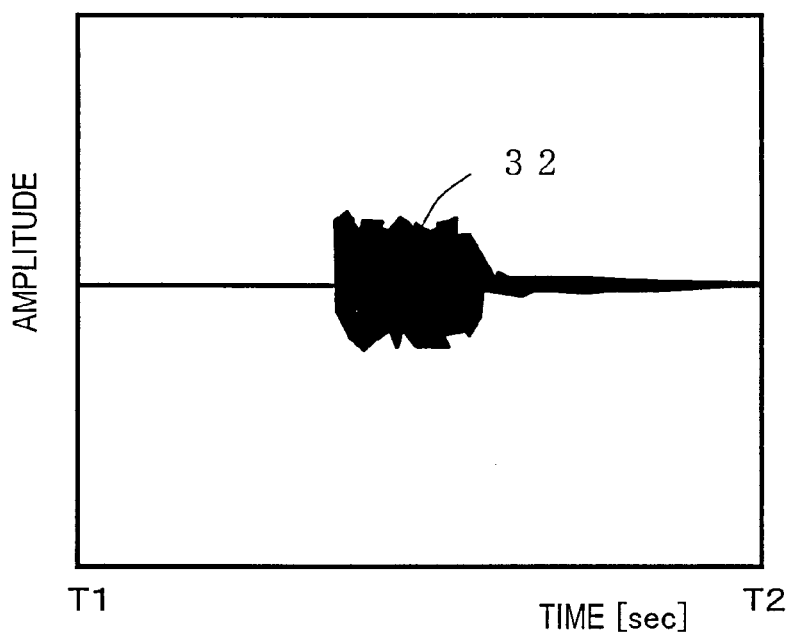
FIG. 8 shows the waveform of the received signal stored in the storage section 15 of the first preferred embodiment.

FIG. 8 shows the waveform of the received signal 32 stored in the first storage section 15. Data with a similar waveform is also stored in the second storage section 15(2). The stored data is output to the interference canceling sections A through D of the first interference canceling unit 17(1) and to those of the second interference canceling unit 17(2).

(Step S63):

The processing step S63 corresponds to Steps B1 and B3. The respective despreading sections 21 of each of the interference canceling sections shown in FIG. 6 despread the received signals with codes other than the desired one, thereby generating despread signals. As used herein, the "codes other than the desired one" refer to the spread codes allocated to the ultrasonic measuring apparatuses S2, S3 and S4 in this preferred embodiment in which the distance from the ultrasonic measuring apparatus S1 to the object 2 and its azimuth are estimated. That is to say, the codes other than the desired one are the spread codes of the ultrasonic waves to be removed as the interference signals.

Figure 9:
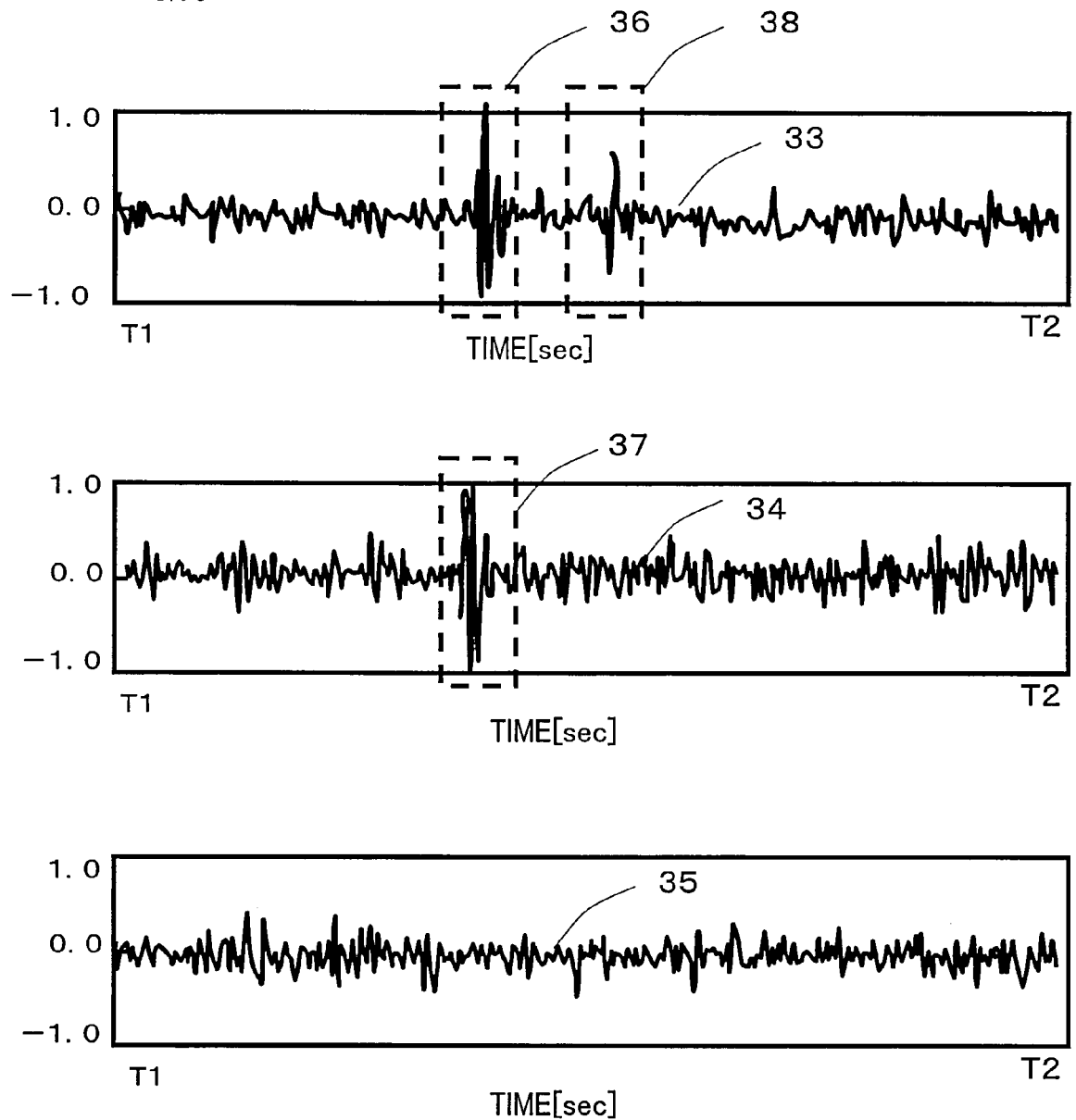
FIG. 9 shows the waveforms of despread signals, from which the interference signals have not been removed yet, according to the first preferred embodiment.

FIG. 9 shows examples of the despread signals, i.e., the despread signals 33, 34 and 35 that have been despread with the spread codes allocated to the ultrasonic measuring apparatuses S2, S3 and S4.

Sine waves 36 and 37 with frequencies of 100 kHz or less are included in the despread signals 33 and 34, but no sine waves are included in the despread signal 35. This means that the ultrasonic wave that has been transmitted from the ultrasonic measuring apparatus S4 is never received. Another sine wave 38 is included in the despread signal 33 and represents the ultrasonic wave that has been reflected by the wall 3 and then transmitted through the ultrasonic wave propagation path 6. Furthermore, the sine waves 36, 37 and 38 are subjected to unique influences while propagating through the propagation paths 5, 6 and 7, and therefore, have different waveforms from the as-transmitted waves. That is to say, these sine waves 36, 37 and 38 reflect the properties of their propagation paths.

The sine waves 36, 37 and 38 included in the despread signals 33 and 34 shown in FIG. 9 are the ultrasonic waves to be removed as the interference signals. However, the despread signals 33 and 34 include not only those sine waves 36, 37 and 38 but also other noise components, of which the amplitudes are not sufficiently smaller than those of the sine waves 36, 37 and 38. That is why the processing of extracting only the sine waves 36, 37 and 38 is carried out.

Figure 10:
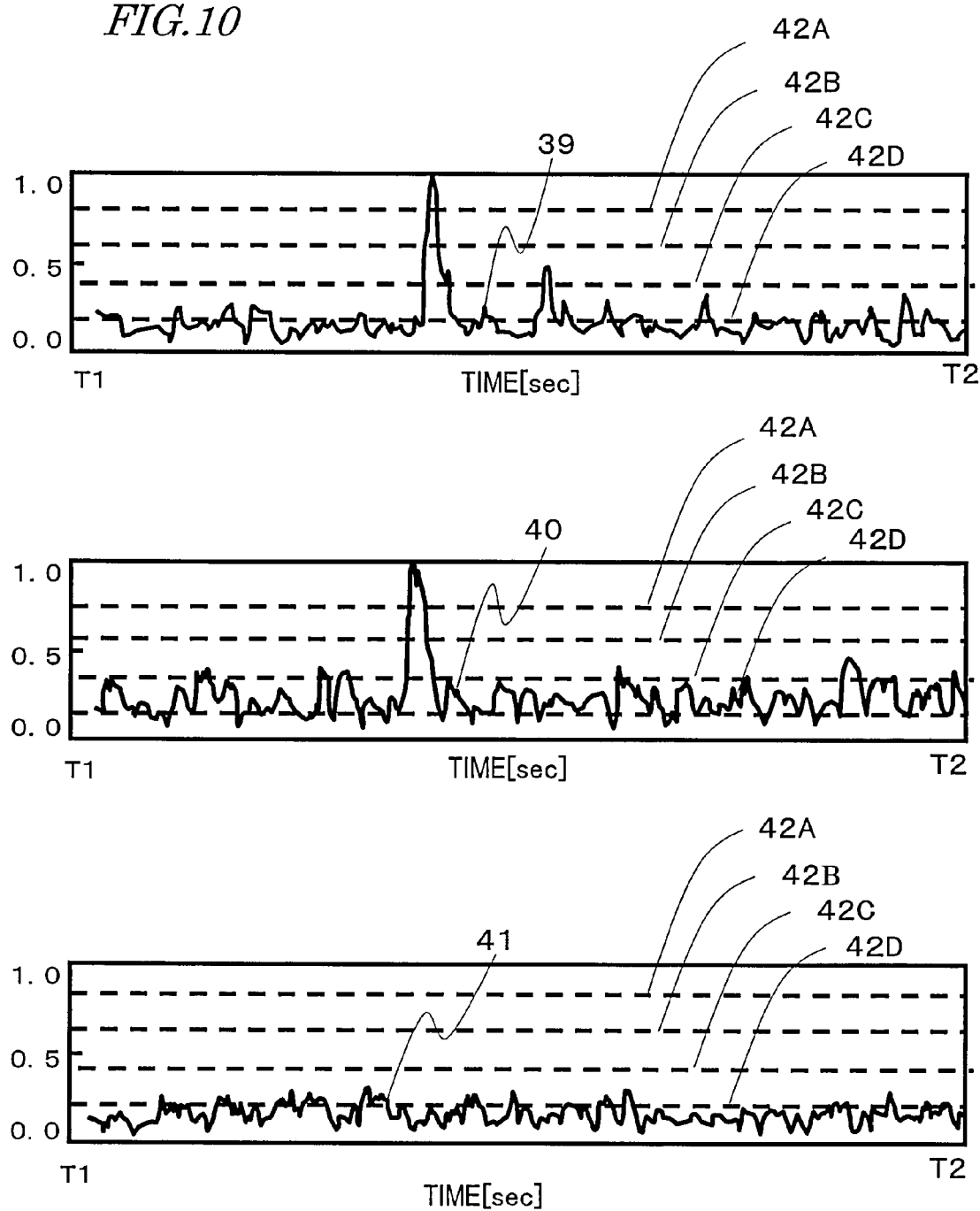
FIG. 10 shows amplitude information waveforms that have been normalized with the maximum amplitude values of the despread signals 33, 34 and 35 shown in FIG. 9.

(Step S64):

The processing step S64 corresponds to Steps C1 and C3. The demodulating sections 22 convert the respective despread signals into amplitude information. In this case, the amplitude information is normalized with the maximum amplitude values of the despread signals 33, 34 and 35. FIG. 10 shows waveforms 39, 40 and 41 obtained by converting the despread signals 33, 34 and 35 into amplitude information.

(Step S65):

The processing step S65 also corresponds to Steps C1 and C3. The extracting sections 23 find time periods, in which the waveforms exceed a predetermined threshold value, in the waveforms representing respective pieces of amplitude information. The threshold values set by the extracting sections 23 are different from each other among the respective interference canceling sections A through D shown in FIG. 6. Specifically, the threshold values set by the respective extracting sections 23 of the interference canceling sections A through D are identified by 42A through 42D in FIG. 10.

Since the order that was used to despread the ultrasonic wave is already known, the ideal autocorrelation value, which is the ratio of the peak value in a situation where there is no signal interference to the noise, and the cross-correlation value in a situation where there is some interference are also predictable as shown in FIGS. 2B and 2C. That is why if the normalized amplitude information of the despread waveforms is available as shown in FIG. 10, the threshold values seem to be calculated easily.

However, the ultrasonic wave attenuates while propagating through the air. The attenuation factor varies with the frequency: the higher the frequency, the greater the attenuation factor. That is why the longer the propagation path, the sooner high-frequency components would attenuate. As shown in FIG. 2A, in the spread signal, portions changing from bits "1" and "0" into "0" and "1", respectively, have high-frequency components. For that reason, the longer the propagation path, the more ambiguous these portions tend to be. As a result, the noise increases.

Furthermore, the energy of an interfering signal varies with the parameters of its own propagation path. Besides, the ultrasonic wave also goes through some changes with time due to the vibrations of the air (which is called "phasing"). For these reasons, the threshold values cannot be defined uniquely.

In this preferred embodiment, a number of threshold values are prepared to perform multiple lines of processing in parallel. Then, the selecting section 20 (to be described later) determines which of those threshold values would produce the best result.

The extracting sections 23 generate a pulse waveform where time periods in which the waveform is equal to or greater than the threshold value are one and the other time periods are zero, and multiply together that waveform and the respective despread signals shown in FIG. 9, thereby generating interference signals to be removed from the received signals.

FIG. 11 shows interference signals 43, 44 and 45 obtained by multiplying together the pulse waveform, generated by the extracting sections 23 using the threshold value 42C, and the despread signals. Comparing FIGS. 9 and 11, it can be seen easily that by using an appropriate threshold value 42C, interference signals 43, 44 and 45, in which only the sine waves 36, 37 and 38 have been extracted just as intended from the despread signals 33 and 34, can be obtained. Also, since no ultrasonic wave to remove is included in the despread signal 35, the interference signal 45 has zero amplitude.

(Step S66):

The processing step S66 corresponds to Steps D1 and D3. The interference signals 43, 44 and 45 thus obtained have been despread, and therefore, cannot be removed directly from the received signals that are spread. That is why the spreading section 24 spreads the interference signals with the spread codes allocated to the respective interference signals.

In the conventional interference canceling method adopted in the field of cellphones, after the code has been determined to be zero or one, the characteristic of the propagation path is evaluated, and then the signals are spread. In contrast, according to the present invention, a portion of the waveform, reflecting the characteristic of the propagation path realized by despreading, is used as it is to spread the signals. As a result, the interference signals, reflecting the characteristic of the propagation path, can be removed without evaluating the characteristic of the propagation path.

Cellphones use higher frequencies than ultrasonic waves. That is why it is very difficult to use the despread waveform. This is because to do so, an A/D converter operating at a frequency that is at least four times as high as the frequency used would be needed and the high order of the M-sequence would require a huge amount of information. To process such a huge amount of information, a number of high-speed DSPs would have to be provided. For these reasons, in the field of cellphones, the despread received wave is never used as it is for spreading. Therefore, to spread the received wave is one of the features of the present invention, which takes advantage of the characteristic of ultrasonic waves that have low frequencies.

(Step S67):

The processing step S67 also corresponds to Steps D1 and D3. The adder 26 removes the spread interference signal from the original received signal either by subtracting the interference signal from the received signal or by inverting the code of the interference signal and adding it to the received signal. In this case, the original received signal is supplied to the adder 26 by way of the delay section 25 so as to be synchronized with the spread interference signal. In this manner, a received signal, from which the interference signal has been removed, can be obtained. However, this received signal has been spread.

(Step S68):

The processing step S68 corresponds to Steps E1 and E3. The spreading section 27 despreads the received signal, from which the interference signal has been removed, with the spread code allocated to the ultrasonic measuring apparatus S1, i.e., the desired code.

(Step S69):

The processing step S69 corresponds to Steps F1 and F3. The storage section 28 stores the spread received signal. As a result, the interference canceling sections A through D of the first interference canceling unit 17(1) obtain a first group of received signals, from which interference signals, generated using mutually different threshold values 42A, 42B, 42C and 42D, have been removed. On the other hand, the interference canceling sections A through D of the second interference canceling unit 17(2) obtain a second group of received signals, from which interference signals, generated using mutually different threshold values 42A, 42B, 42C and 42D, have been removed.

Figure 12:
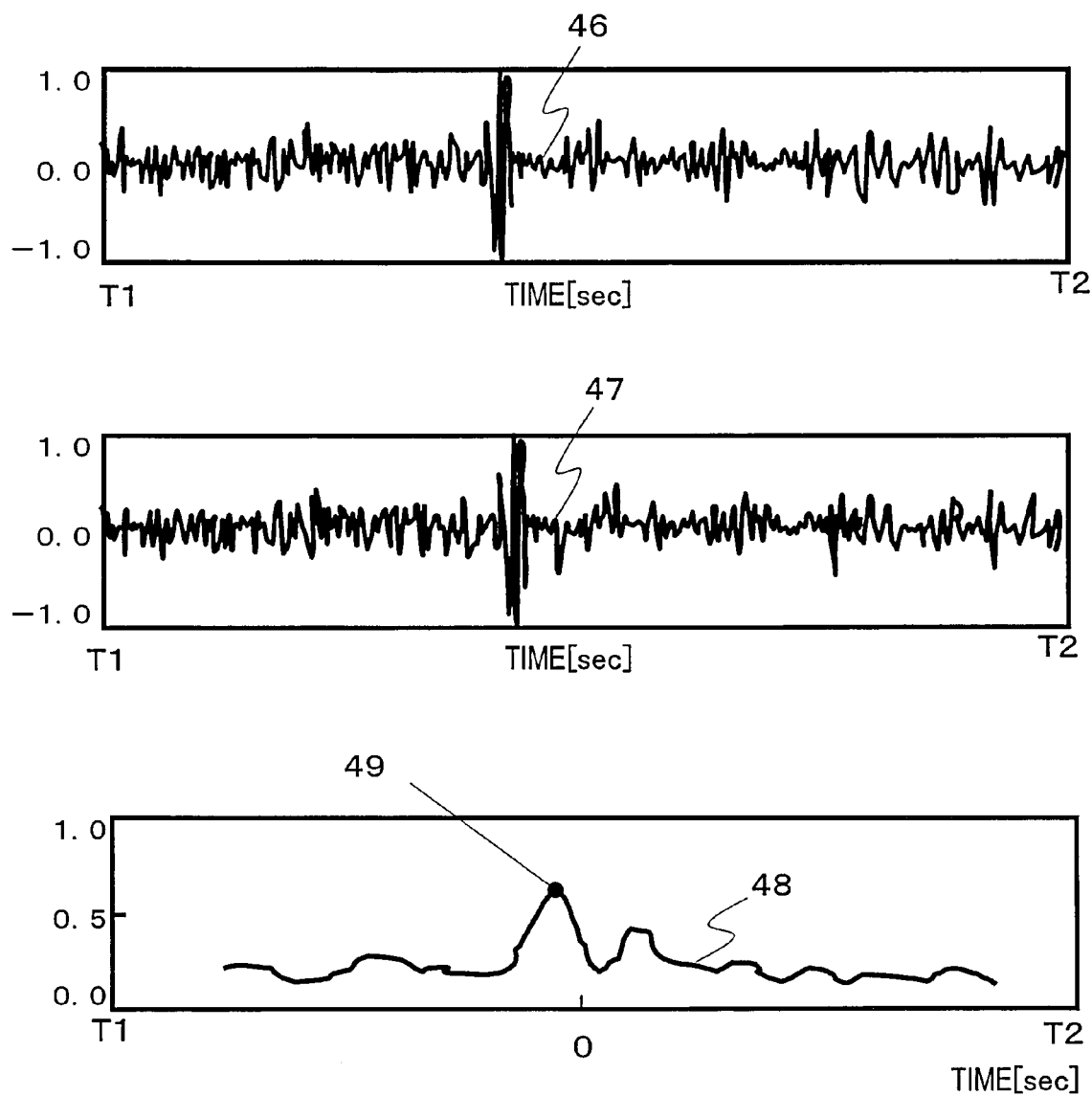
FIG. 12 shows the waveforms of first and second received signals, from which the interference signals have been removed, and the correlation between the received signals.

(Step S70):

The processing step S70 also corresponds to Steps F1 and F3. The correlating sections 18 calculate values of correlation between the first and second groups of received signals, from which the interference signals have been removed, with respect to the four different threshold values 42A, 42B, 42C and 42D. These correlation values represent the degrees of similarity between the first and second groups of received signals. That is to say, a high correlation value represents a high degree of similarity, while a low correlation value represents a low degree of similarity. FIG. 12 shows first and second received signals 46 and 47, from which the interference signals, generated using the threshold value 42A, have been removed.

These two signals are processed by using the following Equations (1) and (2):

$$\phi_{nm}(t) = \int_0^T a_n^*(\tau) a_m(t+\tau) d\tau \quad (1)$$

$$R(t) = \frac{\phi_{12}(t)}{\sqrt{\phi_{11}(0)\phi_{22}(0)}} \quad (2)$$

In this equation, where the received signals 46 and 47 are substituted as a1 (i.e., n=1) and a2 (i.e., m=2), T is T2−T1 set by the storage section, t represents the time, and a* represent the complex conjugate of a.

FIG. 12 shows the correlation value R defined by Equation (2). The waveform 48 of the correlation value has a maximum value 49.

(Step S71):

The processing step S71 corresponds to Steps G1 and G3. The correlation peak value comparing section 19 compares the maximum values of the correlation values that have been calculated with respect to the respective threshold values, thereby determining which pair of the interference canceling sections A through D has output the first and second received signals with the greatest threshold values, i.e., with the highest correlation values.

(Step S72):

The processing step S72 corresponds to Steps H1 and H3. The selecting section 20 selects the first and second received signals with the highest correlation value, which have been determined by the correlation peak value comparing section 19, and outputs them to the distance/azimuth calculating section 12.

The distance/azimuth calculating section 12 figures out the propagation times of the ultrasonic waves based on the first and second received signal supplied.

The time periods of the waves may be calculated directly based on the first and second received signals that have been supplied from the selecting section 20 with the interference signals removed. Alternatively, the first and second received signals may be converted into amplitude information and the peak values of the amplitude information may be located on the time axis. These values may be calculated by the method disclosed in Japanese Journal of Applied Physics Vol. 43, No. 5B, 2004, pp. 3169-3175, for example.

The azimuth may be calculated as the difference between the arrival times of the first and second received signals, from which the interference signals have been removed. Supposing the time lag between the points in time when ultrasonic waves, transmitted from sufficiently far sources, are detected by two ultrasonic receivers, is ΔT and the ultrasonic velocity of the ultrasonic waves is v, the angle θ representing the direction of the object 2 is given by the following Equation using the distance a between the two ultrasonic receivers:

$$\sin\theta = \frac{v\Delta T}{a} \quad (3)$$

Alternatively, the azimuth may be calculated based on the phase difference between the first and second received signals from which the interference signals have been removed. If the ultrasonic waves have a carrier frequency of 40 kHz, then one wavelength will be 25 μl (=1/40 kHz). Since the phase 2π for this one wavelength corresponds to 25 μs, the phase difference can be converted into a time difference. And by using Equation (3), the azimuth can also be calculated.

As described above, according to the present invention, interference signals to remove can be generated even more accurately by selecting a threshold value. Hereinafter, it will be described in detail why the threshold value, associated with a high correlation value between the first and second received signals from which the interference signals have been removed, is selected.

Figure 13:
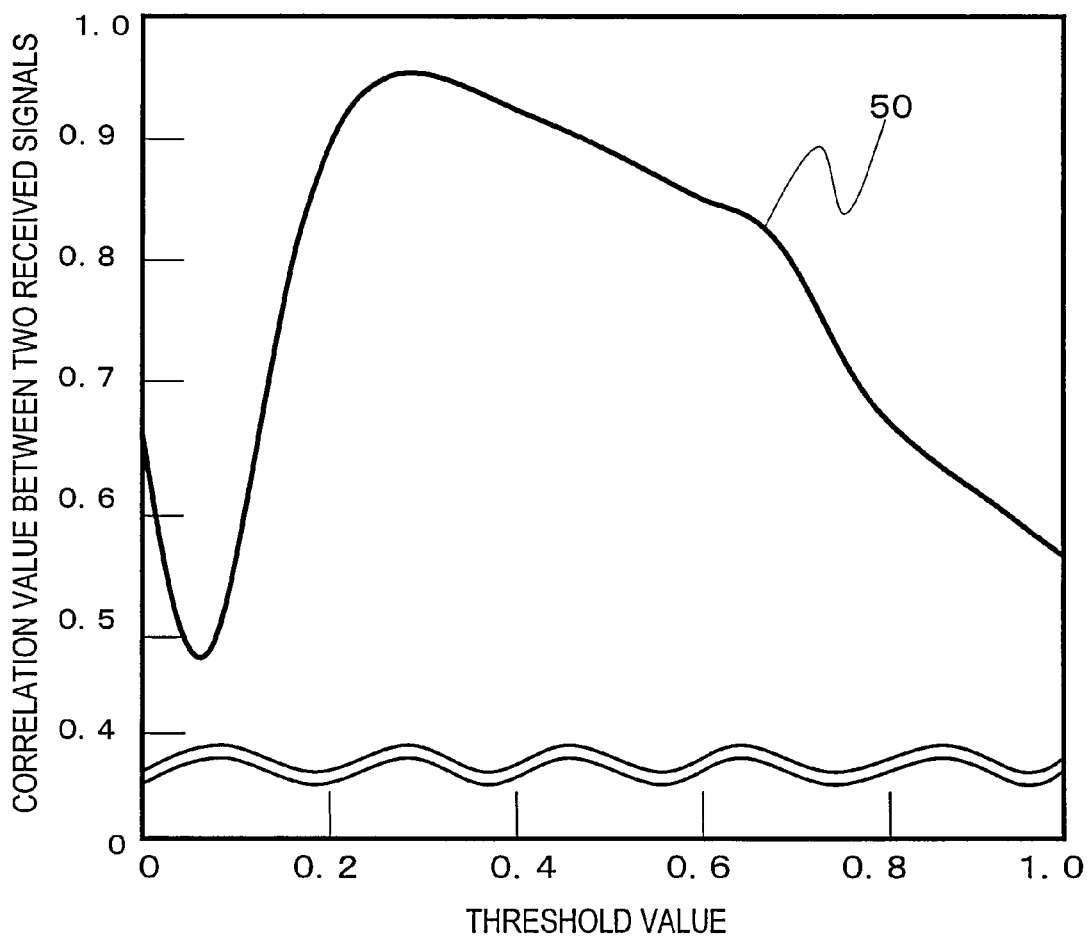
FIG. 13 shows the relation between the threshold value for extracting interference signals and the maximum correlation value of the two received signals in a situation where two ultrasonic waves with mutually different spread codes are interfering with each other.
Figure 14:
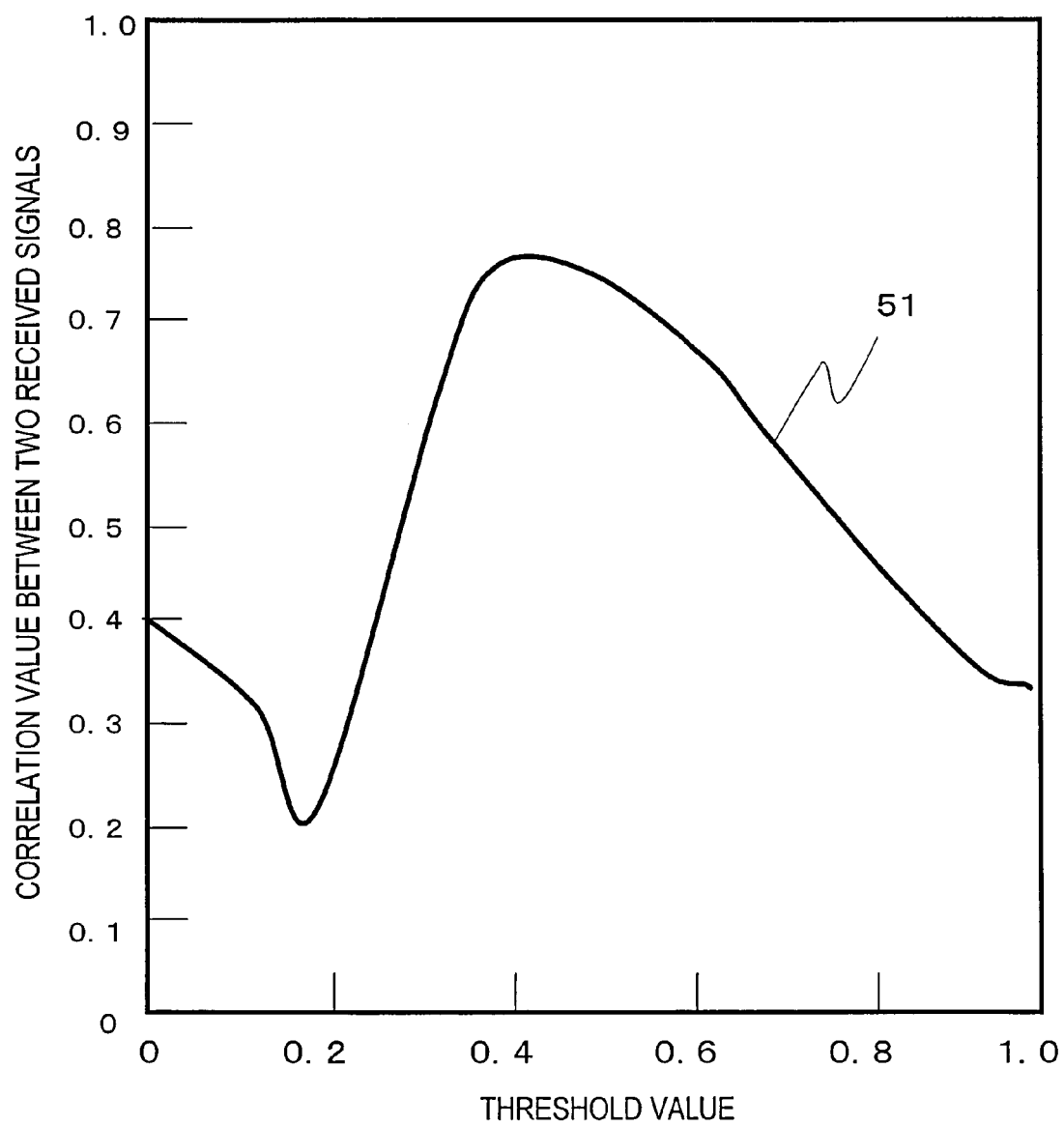
FIG. 14 shows the relation between the threshold value for extracting interference signals and the maximum correlation value of the two received signals in a situation where three ultrasonic waves with mutually different spread codes are interfering with each other.
Figure 15:
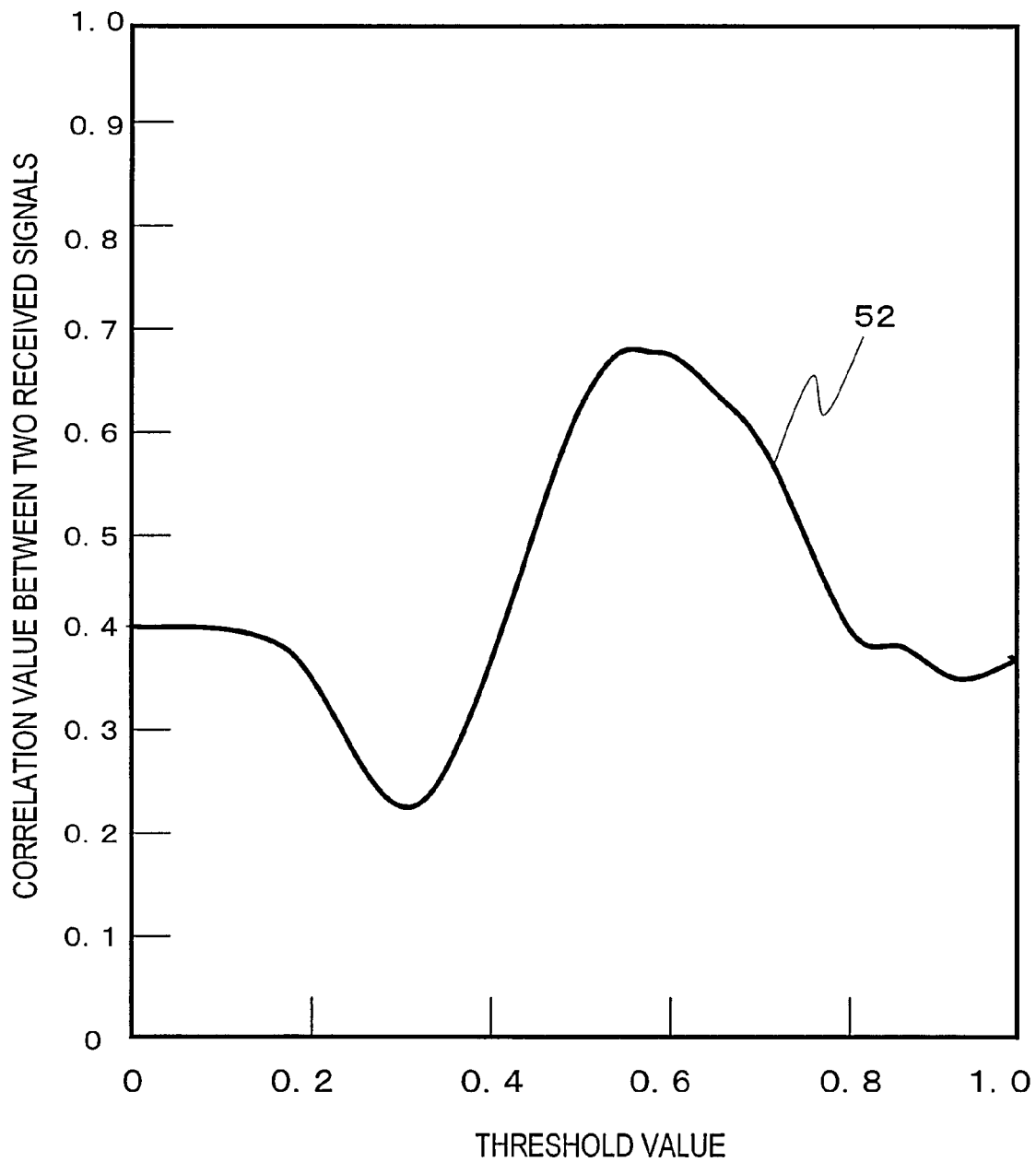
FIG. 15 shows the relation between the threshold value for extracting interference signals and the maximum correlation value of the two received signals in a situation where four ultrasonic waves with mutually different spread codes are interfering with each other.

FIGS. 13 to 15 show relations between the threshold values (see FIG. 10) that are used in the extracting sections 23(1) through 23(3) of the interference canceling sections A through D and the maximum correlation values 49 (see FIG. 12) of the first and second received signals, from which the interference signals have been removed.

FIG. 13 shows a curve 50 representing the relation between the threshold value and the maximum correlation value in a situation where the measurement being carried out by the ultrasonic measuring apparatus S1 is interfered with by the ultrasonic wave transmitted from the ultrasonic measuring apparatus S2 as an interfering wave. That is to say, FIG. 13 shows the relation between the threshold value and the maximum correlation value in a situation where there is a single interference signal.

FIG. 14 shows a curve 51 representing the relation between the threshold value and the maximum correlation value in a situation where the measurement being carried out by the ultrasonic measuring apparatus S1 is interfered with by the ultrasonic waves transmitted from the ultrasonic measuring apparatuses S2 and S3 as interfering waves. That is to say, FIG. 14 shows the relation between the threshold value and the maximum correlation value in a situation where there are two interference signals. In this preferred embodiment, the ultrasonic measuring apparatus S4 transmits no ultrasonic waves. That is why this preferred embodiment satisfies the condition shown in FIG. 14.

FIG. 15 shows a curve 52 representing the relation between the threshold value and the maximum correlation value in a situation where the measurement being carried out by the ultrasonic measuring apparatus S1 is interfered with by the ultrasonic waves transmitted from the ultrasonic measuring apparatuses S2, S3 and S4 as interfering waves. That is to say, FIG. 15 shows the relation between the threshold value and the maximum correlation value in a situation where there are three interference signals.

As can be seen from the curves 50, 51 and 52 shown in FIGS. 13 to 15, there are certain tendencies between the threshold values and the maximum correlation values of the first and second received signals, from which the interference signals have been removed.

If there is no interference signal (i.e., if the first and second receivers 9(1) and 9(2) of the ultrasonic measuring apparatus S1 receive only the ultrasonic wave that has been transmitted by the ultrasonic measuring apparatus S1 itself), the correlation value between the first and second received signals is very high. However, as the number of interference signals increases, the curves 50, 51 and 52 tend to have decreasing maximum correlation values. Also, the greater the number of interference signals, the greater the threshold value associated with the maximum correlation value.

Figure 16:
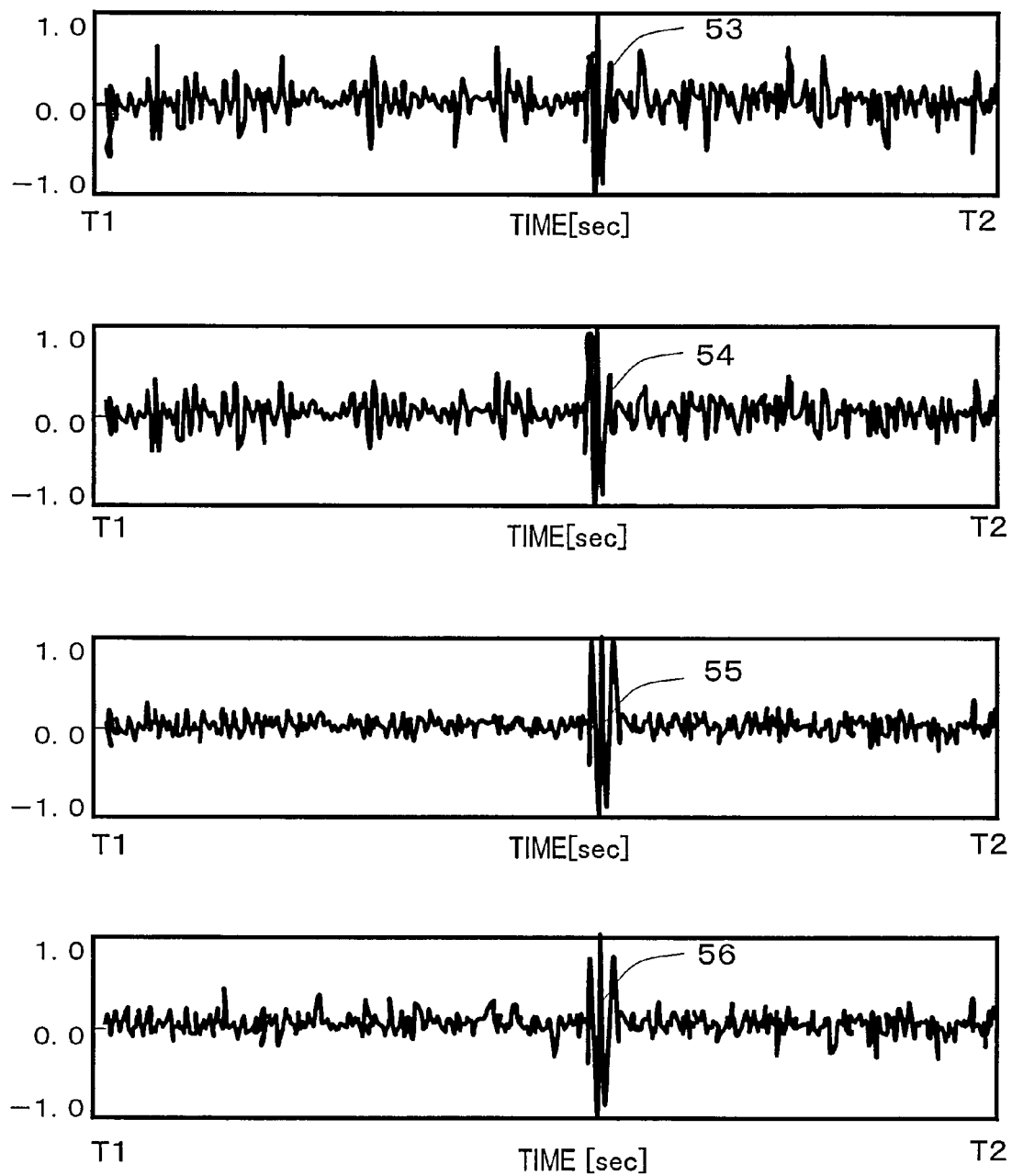
FIG. 16 shows how the waveforms of received signals, from which interference signals have been removed, change with the threshold value for extracting the interference signals.

FIG. 16 shows the waveforms of received signals, obtained by removing the interference signals that have been generated using mutually different threshold values, under the condition that produces the curve 51 shown in FIG. 14, i.e., in a situation where the measurement carried out by the ultrasonic measuring apparatus S1 is interfered with by the ultrasonic waves transmitted from the ultrasonic measuring apparatuses S2 and S3 as interfering waves. More specifically, FIG. 16 shows the waveforms of signals 53, 54, 55 and 56 that were obtained by extracting interference signals with the threshold values set to 0.8, 0.6, 0.4 and 0.2, respectively, and by removing the interference signals thus obtained from the received signals.

As can be seen easily from FIG. 16, the received signal 55, from which the interference signal, generated by using a threshold value of 0.4, was removed, showed the highest SNR, i.e., the interference signal could be removed sufficiently from the received signal 55. Specifically, the SNR of the signal 55 was greater than that of the signal 53, which was obtained by using a threshold value of 0.8, by about 7 dB.

As indicated by the curve 51 shown in FIG. 14, when the threshold value was 0.4, the correlation between the two received signals had the maximum value. That is why by using a threshold value that maximizes the correlation between the two received signals, the interference signals can be removed most accurately and received signals that are least affected by the interference can be obtained.

In addition, by determining which threshold value 42 to select by the correlation value between the received signals from which the interference signals have been removed, the interference signals can be reproduced more accurately than determining the threshold value simply by the SNR. And by removing those accurate interference signals from the received signals, the resultant received signals are much less affected by the interference signals. For example, from the despread signal 33 shown in FIG. 9, even the information that may or may not have been produced due to noise, such as the wave 38, can also be extracted accurately as the interference signal. Consequently, by properly evaluating the influence of the propagation path on an interference signal, the interference signal can be reproduced and can be removed from the received signal.

This is one of the features of the present invention. And by getting these received signals, from which the interference signals have been removed, compared to each other by the two receivers and by learning the parameters of the interference canceling process, the best interference canceling process is realized.

By performing the processing steps described above, even if there are a number of mutually interfering ultrasonic waves with different codes, the best interference canceling is realized by calculating the value of correlation between the received signals of the two ultrasonic receivers, from which the interference signals have been removed. As a result, the distance to the object and its azimuth can be estimated accurately.

In the preferred embodiment described above, the ultrasonic measuring apparatus is supposed to include an ultrasonic transmitter and an ultrasonic receiver that are both fixed. However, the ultrasonic measuring apparatus does not have to include a transmitter. Optionally, the present invention is also applicable to a situation where an ultrasonic transmitter and an ultrasonic receiver are arranged at mutually different positions and the distance between the ultrasonic transmitter and the ultrasonic receiver should be measured.

EMBODIMENT 2

Figure 17:
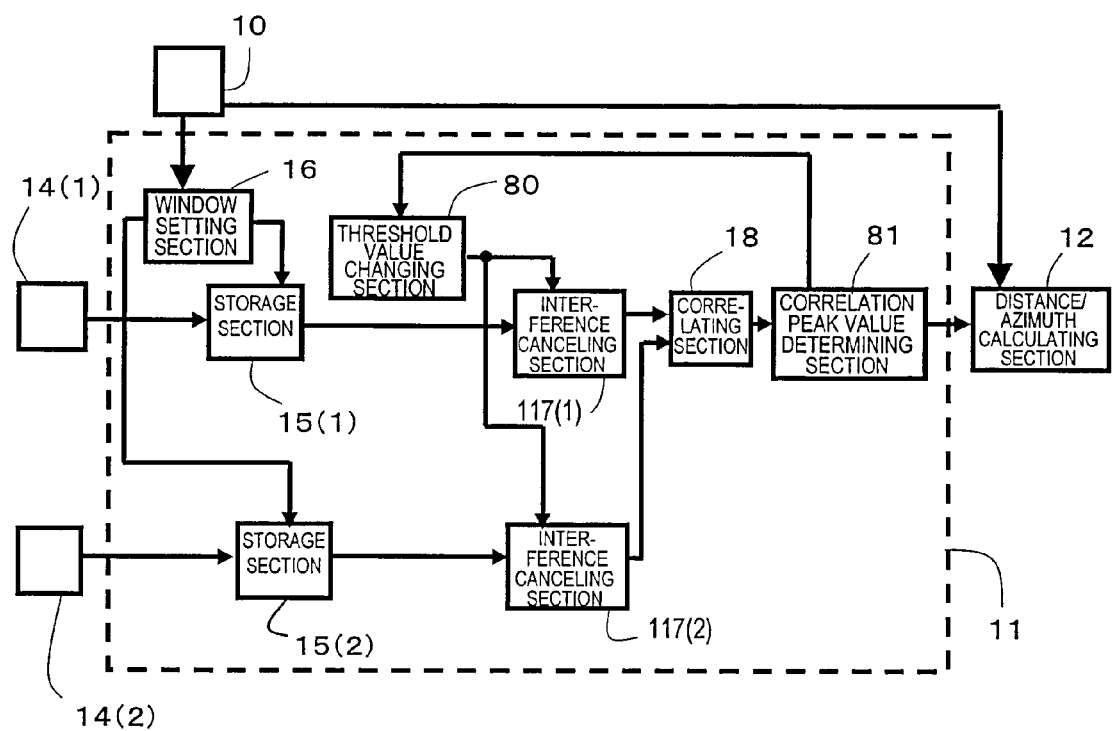
FIG. 17 is a block diagram showing the basic configuration of a best interference canceling processor 11 according to a second preferred embodiment of the present invention.

FIG. 17 is a block diagram showing the basic configuration of a best interference canceling processor 11 for use in an ultrasonic measuring apparatus and ultrasonic measuring method according to a second preferred embodiment of the present invention.

As in the first preferred embodiment described above, the ultrasonic measuring apparatus and ultrasonic measuring method of the second preferred embodiment is also used to estimate the distance and azimuth while eliminating the effect of interfering ultrasonic waves in an environment where there are a number of ultrasonic measuring apparatuses. Although a number of interference signals are generated in parallel by using a plurality of preset threshold values in the first preferred embodiment described above, the best threshold value is searched for according to this preferred embodiment while estimating the variation in cross-correlation value.

The ultrasonic measuring apparatus of this second preferred embodiment has the same configuration as the counterpart of the first preferred embodiment described above except the best interference canceling processor 11.

As shown in FIG. 17, the best interference canceling processor 11 of this preferred embodiment includes a window setting section 16, a first storage section 15(1), a second storage section 15(2), a first interference canceling section 117(1), a second interference canceling section 117(2), a correlating section 18, a threshold value changing section 80 and a correlation peak value determining section 81.

The window setting section 16, the first storage section 15(1), the second storage section 15(2) and the correlating section 18 operate just like the their counterparts of the first preferred embodiment described above.

The first and second interference canceling sections 117(1) and 117(2) have the same configuration as the interference canceling sections A through D that have already been described for the first preferred embodiment with reference to FIG. 7, and generate interference signals based on received signals and obtain received signals from which the interference signals have been removed. In the first preferred embodiment, however, the extracting sections 23(1) to 23(3) generate the interference signals using the preset threshold values. On the other hand, according to this preferred embodiment, the threshold value changing section 80 determines the threshold value and the first and second interference canceling sections 117(1) and 117(2) generate the interference signals with respect to the threshold value determined.

The correlation peak value determining section 81 estimates the maximum correlation value between the first and second received signals, from which the interference signals have been removed. If the maximum correlation value is low, the correlation peak value determining section 81 instructs the threshold value changing section 80 to change the threshold values. In response, the threshold value changing section 80 sets a new threshold value, and the first and second interference canceling sections 117(1) and 117(2) generate interference signals with respect to the new threshold value. This loop will be performed repeatedly with the threshold values changed until the greatest maximum correlation value is reached.

When the greatest maximum correlation value is obtained, the correlation peak value determining section 81 outputs the first and second received signals at that point in time to the distance/azimuth calculating section 12. In response, the distance/azimuth calculating section 12 calculates at least one of distance and azimuth as in the first preferred embodiment described above.

Hereinafter, it will be described how the best interference canceling processor 11 searches for the threshold value.

Figure 18:
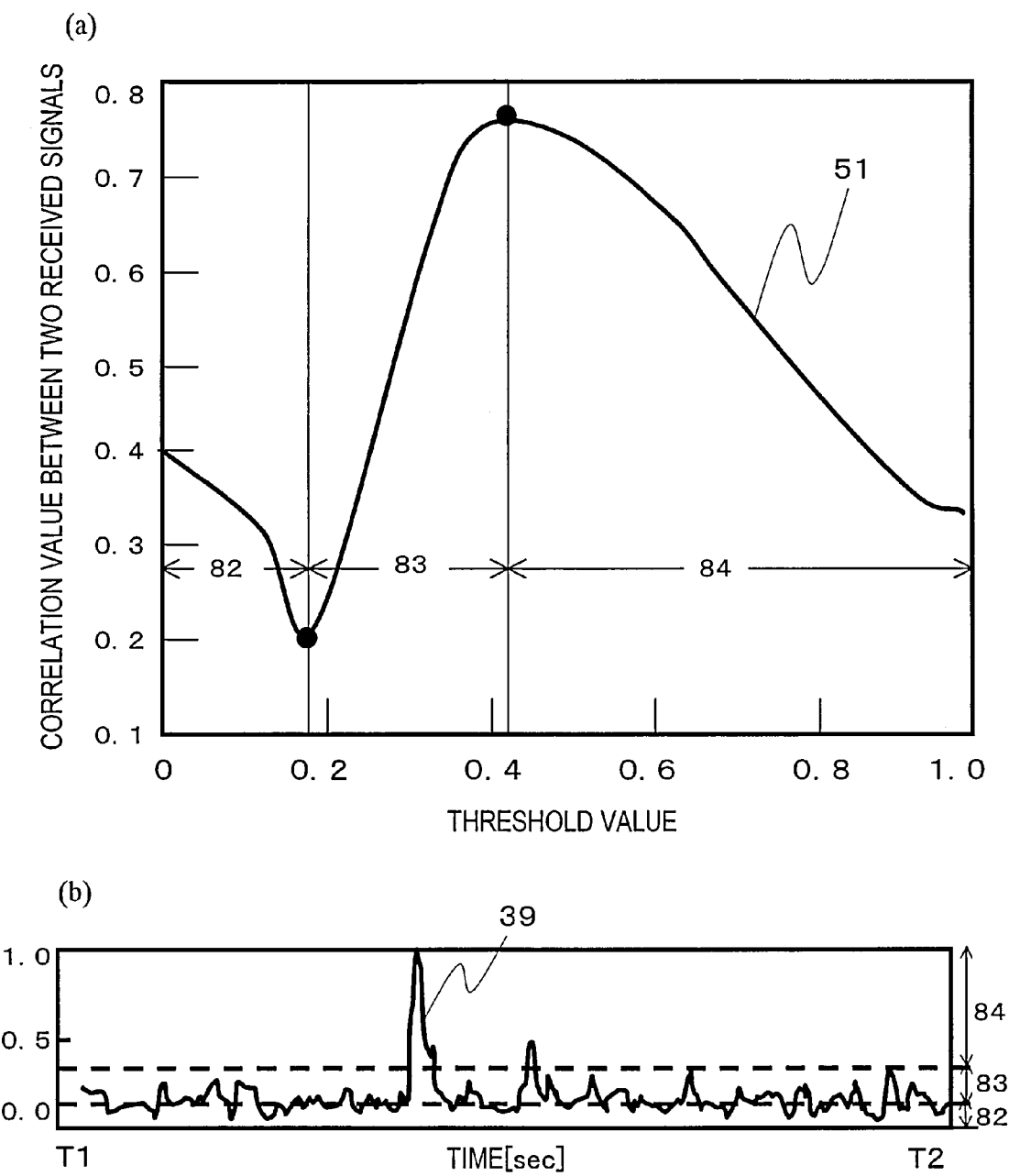
FIG. 18(a) shows the relation between the threshold value and the maximum correlation value of the two received signals according to the second preferred embodiment.
FIG. 18(b) is a waveform representing the amplitude information of the interference signal to remove.

FIG. 18(*a*) shows a curve 51 representing the relation between the threshold value set by the threshold value changing section 80 and the correlation value detected by the correlation peak value determining section 81. On the other hand, FIG. 18(*b*) shows a normalized waveform 39 of amplitude information for a waveform that has been despread with a spread code allocated to the ultrasonic measuring apparatus S2. The waveform 39 is the amplitude information waveform of an interference signal to remove.

As shown in FIG. 18(*a*), the curve 51 representing the relation between the threshold value and the maximum correlation value of the first and second received signals, from which the interference signals have been removed, can be divided into the three ranges 82, 83 and 84. The threshold values for the ranges 82, 83 and 84 shown in FIG. 18(*a*) are also shown in FIG. 18(*b*).

As is clear from FIG. 18(*b*), in the range 84, the ultrasonic wave that has been transmitted from the ultrasonic measuring apparatus S2 (or reflected from a wall) and that should be removed as an interference signal is selected with respect to a threshold value. In the range 83, included are only high-energy ones of noise components (including the ultrasonic waves that have come from the remaining ultrasonic measuring apparatuses, other than the apparatus S2, and the noise of the receiving system). And in the range 82, included is all received data.

If a threshold value is set on the boundary between the ranges 82 and 83, only high-energy ones of the noise components are extracted. That is why compared to extracting all of those noise components, the correlation value decreases. As is clear from the curves 50, 51 and 52 shown in FIGS. 13, 14 and 15, the threshold value associated with the lowest correlation value changes with the number of interfering signals. In any case, however, the correlation value reaches its minimum value when the threshold value is greater than zero. That is why there is no need to search for the threshold value in the entire range of zero to one. But the best threshold value just needs to be searched for in the threshold value range in which the correlation value is equal to or greater than its minimum value. Consequently, by changing the threshold values a number of times by utilizing such a characteristic, the best threshold value can be estimated.

Figure 19:
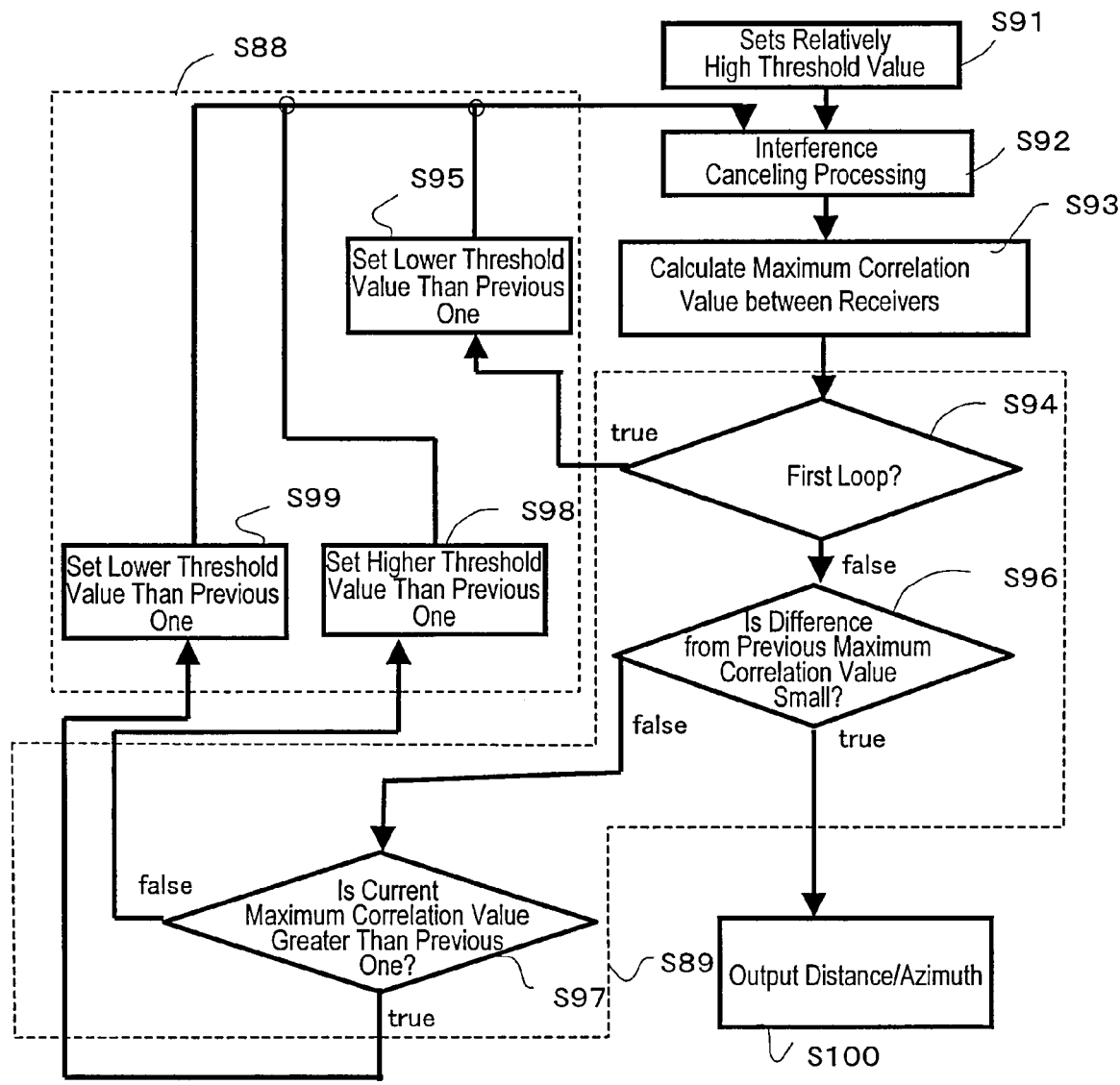
FIG. 19 is a flowchart showing an ultrasonic measuring method according to the second preferred embodiment.
Figure 22:
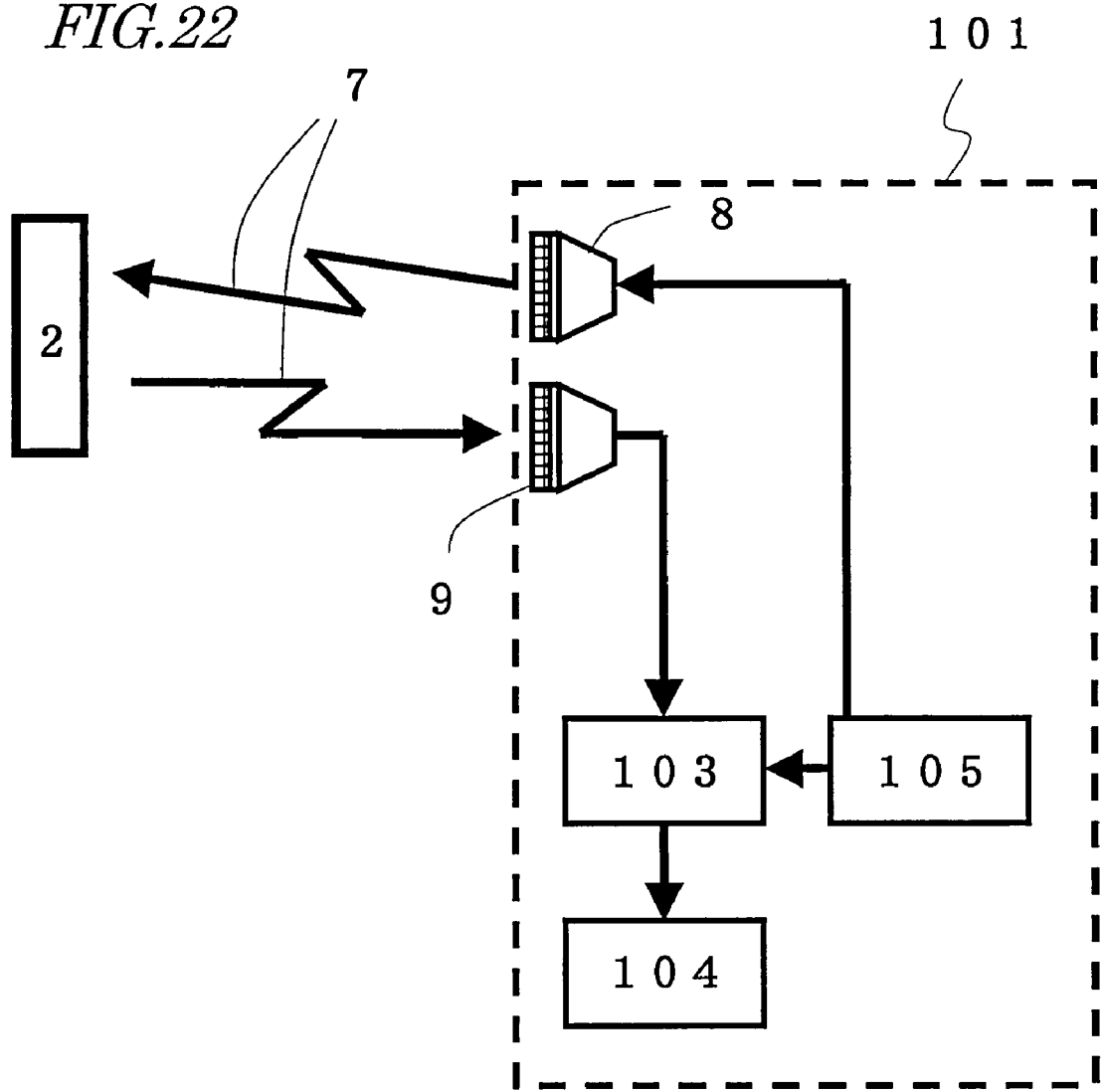
FIG. 22 is a block diagram showing the basic configuration of a conventional ultrasonic measuring apparatus.
Figure 23:
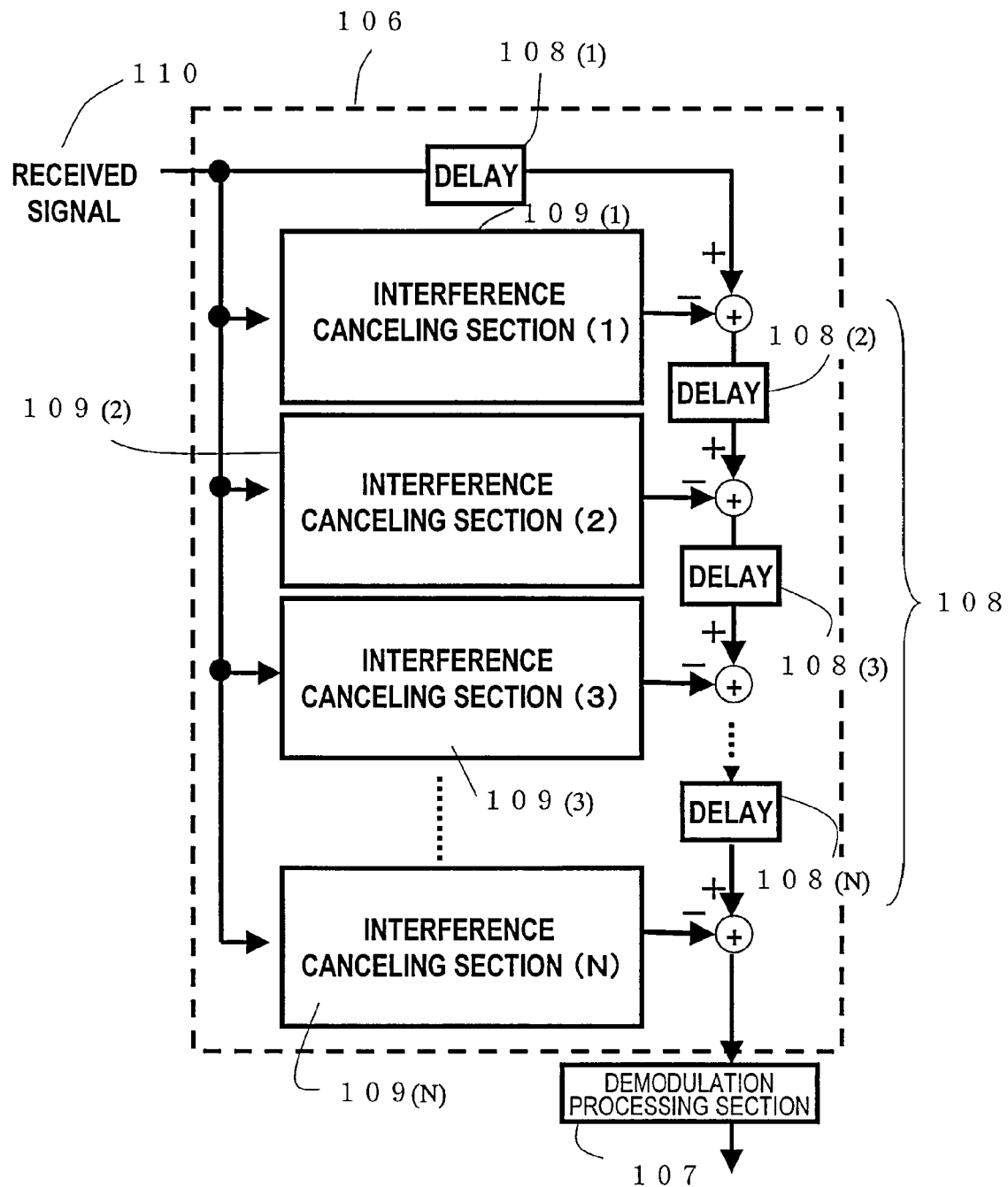
FIG. 23 is a block diagram showing the basic configuration of a conventional interference canceller for use in the field of cellphones.
Figure 24:
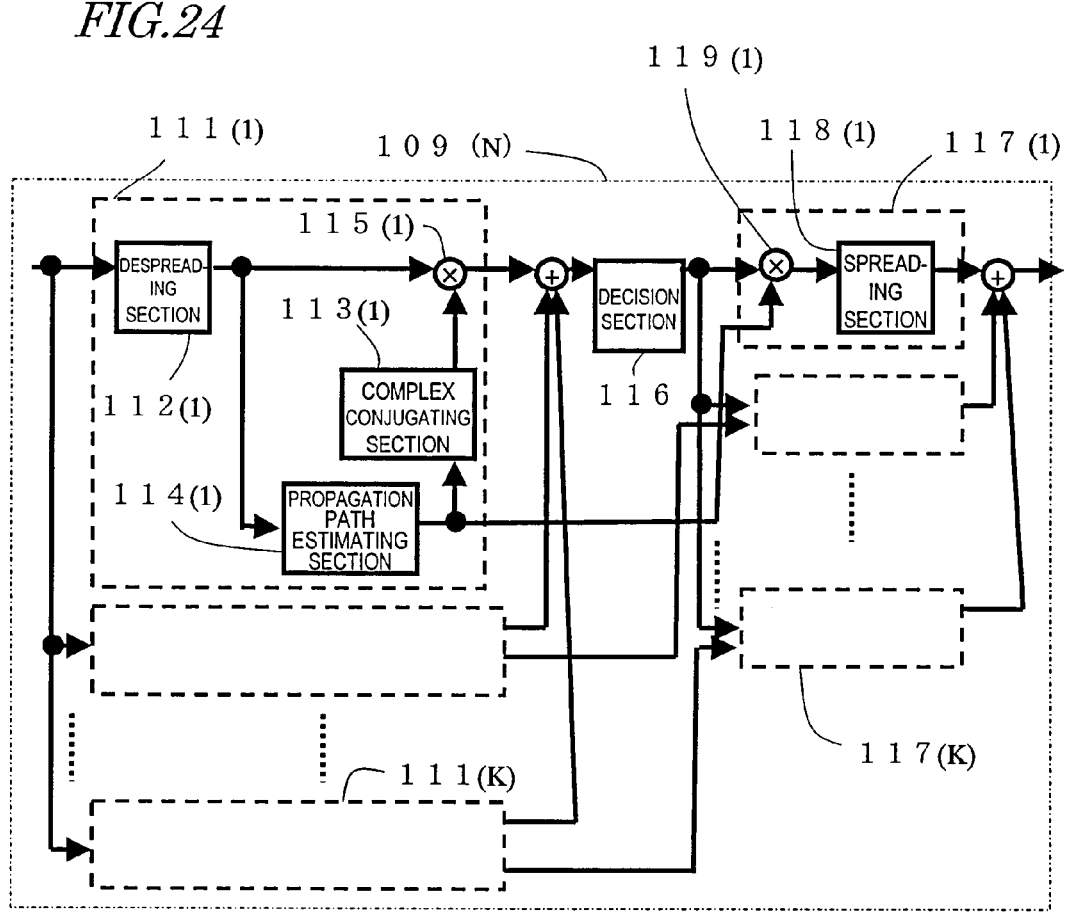
FIG. 24 is a block diagram showing the configuration of the interference canceling section of the interference canceller shown in FIG. 23.

Next, it will be described with reference to the flowchart of FIG. 19 how to search for the threshold value.

Before starting to search for the threshold value, first, the first and second received signals are processed as already described for the first preferred embodiment. Specifically, as in the first preferred embodiment described above, the first and second receivers 9(1) and 9(2) receive ultrasonic waves and the first and second receiving sections 14(1) and 14(2) amplify the first and second received signals and subject them to A/D conversion in Step A2 as shown in FIG. 3. Next, as shown in FIG. 17, the window setting section 16 cuts out the first and second received signals and stores the data in the first and second storage sections 15(1) and 15(2). Subsequently, the received signals are despread with codes other than the desired one, thereby obtaining despread signals in Step B2.

The threshold value may be searched for in the following manner. First, the threshold value changing section 80 sets the threshold value relatively high (e.g., to 0.8) in Step S91, C2. The first and second interference canceling sections 117(1) and 117(2) generate interference signals by using the preset threshold values and obtain signals with the interference signals removed from the first and second received signals in Step S92, D2, E2 as already described for the first preferred embodiment. The correlating section 18 calculates the maximum correlation value between the two signals in Step S93, F2.

Next, the process advances to the determining step 81. The correlation peak value determining section 81 stores the maximum correlation value obtained. Since the previous maximum correlation value is not stored in the first loop, it cannot be determined whether the value acquired this time is a good value or not. That is why no decision is made in the first loop but the process advances to the threshold value changing step 88. That is to say, if the answer to the query of Step S94 is that this is the first loop, the correlation peak value determining section 81 instructs the threshold value changing section 80 to set a relatively low threshold value of 0.6, for example, in Step S95, G2.

The first and second interference canceling sections 117(1) and 117(2) generate interference signals with respect to the threshold value that has been set, thereby generating first and second received signals from which the interference signals have been removed in Step S92, H2. The correlating section 18 calculates the maximum correlation value between the two signals.

Since the answer to the query of Step S94 is that this is not the first loop, the correlation peak value determining section 81 compares the previous and current maximum correlation values in Step S96, H2. If the difference between the previous and current maximum correlation values is smaller than a predetermined value, then the threshold value has been set in the vicinity of the maximum correlation value on the curve 51 shown in FIG. 18. That is why it is determined that the maximum correlation value has been obtained to finish the search and calculate the distance and the azimuth in Step S100, I2.

On the other hand, if the difference between the previous and current maximum correlation values is not smaller than the predetermined value, then the correlation peak value determining section 81 determines whether or not the current maximum correlation value is greater than the previous one in Step S97. If the answer is YES, then the correlation peak value determining section 81 instructs the threshold value changing section 80 to set a threshold value that is even lower than the previous one. Otherwise, the correlation peak value determining section 81 instructs the threshold value changing section 80 to set a threshold value that is higher than the previous one.

If the difference between the previous and current maximum correlation values becomes smaller than the predetermined value by repeatedly performing the maximum correlation value calculating and determining step S89 and the threshold value changing step S88 (Step H2), then the threshold value has been set in the vicinity of the maximum correlation value on the curve 51 shown in FIG. 18 as described above. In that case, it is determined that the maximum correlation value has been obtained to finish the search and calculate the distance and the azimuth in Step S100, I2.

As described above, according to this preferred embodiment, while the correlation value between two signals, generated by removing interference signals from the signals received at the two receivers, is estimated, the best threshold value to generate the interference signals is searched for, thereby doing best interference canceling on the received signals. According to this method, even if the waveform or the degree of influence of the interfering ultrasonic wave varies with the measuring environment, received signals, from which the influence of the interference signals has been eliminated as much as possible, can also be obtained. Consequently, the distance and the azimuth can be measured accurately in any environment.

EXPERIMENTAL EXAMPLES

The present inventors carried out an experiment to see how interference signals could be removed by the configuration of the first preferred embodiment described above. The results are as follows.

FIG. 20(*a*) shows the waveform of an ultrasonic wave that was spread with a code A. FIG. 20(*b*) shows the waveform of a combination of the ultrasonic wave spread with the code A and an ultrasonic wave that was spread with a code B.

FIG. 20(*c*) shows a waveform, from which the ultrasonic wave spread with the code B was removed as an interfering wave by despreading the combination of the ultrasonic waves that had been spread with the codes A and B, respectively (i.e., the ultrasonic wave with the waveform shown in FIG. 20(*b*)) with the code A. FIG. 20(*d*) shows a waveform, from which the ultrasonic wave spread with the code B was removed as an interfering wave by using the apparatus of the first preferred embodiment.

FIGS. 21(*a*), 21(*b*) and 21(*c*) show waveforms that were obtained by despreading the respective signals with the waveforms shown in FIGS. 20(*a*), 20(*c*) and 20(*d*) with the code A and then cutting out portions of the resultant signals.

As can be seen easily from FIG. 21(*a*), if there were no interfering ultrasonic waves, a waveform with a high SNR could be obtained by despreading.

On the other hand, if there were some interfering ultrasonic waves, the waveforms obtained by despreading showed decreased SNRs as shown in FIGS. 21(*b*) and 21(*c*). However, comparing the portions P shown in FIG. 21(*b*) to the portions Q shown in FIG. 21(*c*), it can be seen easily that the first preferred embodiment showed smaller noise amplitude and an increased SNR.

The interference signal removing method for use in the ultrasonic measuring apparatus and ultrasonic measuring method of the present invention can be used effectively not only to estimate the distance and azimuth using ultrasonic waves.

Specifically, the interference signal removing method for use in the present invention may also be used to orient an indoor sound source for transmitting information using ultrasonic waves as carrier waves or to make ultrasonic tags.

INDUSTRIAL APPLICABILITY

Even in an environment where there are a number of other ultrasonic measuring apparatuses, the ultrasonic measuring apparatus and ultrasonic measuring method of the present invention can also estimate the distance and azimuth highly accurately by realizing the best interference canceling. Among other things, since high accuracy measurements are realized even when some variation occurs in the measuring environment, the present invention can be used effectively to make a rangefinder or azimuth meter to be installed in a self-moving robot. For example, the present invention is preferably applicable to a transporter robot for use in indoor environments such as railroad stations and airports.

The invention claimed is:

1. An ultrasonic measuring method for estimating at least one of the propagation distance and the propagation azimuth of a desired ultrasonic wave, which is one of a number of ultrasonic waves that have been transmitted by a spread spectrum technique using mutually different codes, the method comprising the steps of:

(A1) receiving the ultrasonic waves, which have been transmitted by the spread spectrum technique using the mutually different codes, at first and second receivers, thereby generating first and second received signals, respectively;

(B1) despreading the first and second received signals with a code that has been used to spread any of the ultrasonic waves other than the desired one, thereby generating at least one despread signal;

(C1) extracting a plurality of signals, of which the amplitudes are equal to or greater than respective threshold values, from the despread signal using the threshold values, thereby generating mutually different interference signals for the respective threshold values;

(D1) spreading the interference signals with the code that has been used to spread the ultrasonic wave other than the desired one and then removing the interference signals from the first and second received signals, thereby generating first and second received signals, from which the interference signals have been removed, for the respective threshold values;

(E1) despreading the first and second received signals, from which the interference signals have been removed, with the code of the desired ultrasonic wave, thereby generating first and second despread received signals, from which the interference signals have been removed, for the respective threshold values;

(F1) calculating maximum correlation values between the first and second despread received signals for the respective threshold values;

(G1) determining at which of the threshold values the greatest one of the maximum correlation values has been obtained; and (H1) calculating at least one of the propagation distance and the propagation azimuth of the desired ultrasonic wave by the amount of time it has taken for the first and second despread received signals, associated with the threshold value determined, to reach the first and second receivers.

2. The method of claim 1, wherein using a plurality of preset threshold values, the steps (C1) through (F1) are performed on the respective threshold values in parallel with each other.

3. The method of claim 1, wherein the codes are M-sequence pseudo spread codes.

4. The method of claim 1, wherein 0 and 180 degree phases of the ultrasonic waves are allocated to the codes.

5. The method of claim 1, wherein the maximum correlation value between the first and second despread received signals is calculated by finding correlation between complex numbers.

6. An ultrasonic measuring method for estimating at least one of the propagation distance and the propagation azimuth of a desired ultrasonic wave, which is one of a number of ultrasonic waves that have been transmitted by a spread spectrum technique using mutually different codes, the method comprising the steps of:

(A2) receiving the ultrasonic waves, which have been transmitted by the spread spectrum technique using the mutually different codes, at first and second receivers, thereby generating first and second received signals, respectively;

(B2) despreading the first and second received signals with a code that has been used to spread any of the ultrasonic waves other than the desired one, thereby generating at least one despread signal;

(C2) extracting a signal, of which the amplitude is equal to or greater than a threshold value, from the despread signal using the threshold value, thereby generating an interference signal;

(D2) spreading the interference signal with the code that has been used to spread the ultrasonic wave other than the desired one and then removing the interference signal from the first and second received signals, thereby generating first and second received signals, from which the interference signal has been removed;

(E2) despreading the first and second received signals, from which the interference signal has been removed, with the code of the desired ultrasonic wave, thereby generating first and second despread received signals, from which the interference signal has been removed;

(F2) calculating a maximum correlation value between the first and second despread received signals;

(G2) performing the steps (B2) through (F2) with the threshold values changed;

(H2) repeatedly performing the step (G2) until a difference between the maximum correlation value and its previous value becomes equal to or smaller than a predetermined value; and (I2) calculating at least one of the propagation distance and the propagation azimuth of the desired ultrasonic wave by the amount of time it has taken for the first and second despread received signals, associated with the threshold value at which the difference between the maximum correlation value and its previous value becomes equal to or smaller than the predetermined value, to reach the first and second receivers.

7. The method of claim 6, wherein the step (H2) includes determining the threshold value by the difference between the maximum correlation value and its previous value.

8. An ultrasonic measuring apparatus for estimating at least one of the propagation distance and the propagation azimuth of a desired ultrasonic wave, which is one of a number of ultrasonic waves that have been transmitted by a spread spectrum technique using mutually different codes, the apparatus comprising:

first and second receivers for receiving the ultrasonic waves, which have been transmitted by the spread spectrum technique using the mutually different codes, thereby generating respective received signals;

first and second interference canceling sections that are connected to the first and second receivers, the canceling sections despreading the received signals with a code that has been used to spread any of the ultrasonic waves other than the desired one, thereby generating at least one despread signal; extracting a plurality of signals, of which the amplitudes are equal to or greater than respective threshold values, from the despread signal using the threshold values, thereby generating mutually different interference signals for the respective threshold values; spreading the interference signals with the code that has been used to spread the ultrasonic wave other than the desired one and then removing the interference signals from the received signals, thereby generating received signals, from which the interference signals have been removed, for the respective threshold values; despreading the received signals, from which the interference signals have been removed, with the code of the desired ultrasonic wave, thereby generating despread received signals, from which the interference signals have been removed, for the respective threshold values;

a correlating section for calculating maximum correlation values between the despread received signals, which have been generated by the first and second interference canceling sections and from which the interference signals have been removed, for the respective threshold values;

a selecting section for selecting one of the threshold values at which the greatest one of the maximum correlation values for the respective threshold values has been obtained; and a distance/azimuth calculating section for calculating at least one of the propagation distance and the propagation azimuth of the desired ultrasonic wave by the amount of time it has taken for the despread received signals, which are associated with the threshold value selected and from which the interference signals have been removed, to reach the first and second receivers.

9. The ultrasonic measuring apparatus of claim 8, wherein by using a plurality of preset threshold values, the first and second interference canceling sections generate the despread received signals, from which the interference signals have been removed, for the respective threshold values.

10. The ultrasonic measuring apparatus of claim 8, wherein the codes are M-sequence pseudo spread codes.

11. The ultrasonic measuring apparatus of claim 8, wherein 0 and 180 degree phases of the ultrasonic waves are allocated to the codes.

12. The ultrasonic measuring apparatus of claim 8, wherein the correlating section calculates the maximum correlation value between the first and second despread received signals by finding correlation between complex numbers.

13. An ultrasonic measuring apparatus for estimating at least one of the propagation distance and the propagation azimuth of a desired ultrasonic wave, which is one of a number of ultrasonic waves that have been transmitted by a spread spectrum technique using mutually different codes, the apparatus comprising:

first and second receivers for receiving the ultrasonic waves, which have been transmitted by the spread spectrum technique using the mutually different codes, thereby generating respective received signals;

a threshold value changing section for updating and sequentially generating threshold values in accordance with an instruction;

first and second interference canceling sections that are connected to the first and second receivers, the canceling sections despreading the received signals with a code that has been used to spread any of the ultrasonic waves other than the desired one every time the threshold value is updated, thereby generating at least one despread signal; extracting a signal, of which the amplitude is equal to or greater than a threshold value, from the despread signal using the threshold value, thereby generating an interference signal; spreading the interference signal with the code that has been used to spread the ultrasonic wave other than the desired one and then removing the interference signal from the received signals, thereby generating received signals, from which the interference signal has been removed; despreading the received signals, from which the interference signal has been removed, with the code of the desired ultrasonic wave, thereby generating despread received signals, from which the interference signal has been removed;

a correlating section for calculating a maximum correlation value between the despread received signals, which have been generated by the first and second interference canceling sections and from which the interference signal has been removed, for the respective threshold values;

a correlation peak value determining section for calculating a difference between the maximum correlation value and its previous value and instructing the threshold value changing section to select the threshold value if the difference is equal to or smaller than a predetermined value and to update the threshold value if the difference is greater than the predetermined value; and a distance/azimuth calculating section for calculating at least one of the propagation distance and the propagation azimuth of the desired ultrasonic wave by the amount of time it has taken for the despread received signals, which are associated with the threshold value selected and from which the interference signal has been removed, to reach the first and second receivers.

14. The ultrasonic measuring apparatus of claim 13, wherein the correlation peak value determining section instructs the threshold value changing section to change the threshold values according to the difference between the maximum correlation value and its previous value.

* * * * *

UNITED STATES PATENT AND TRADEMARK OFFICE
CERTIFICATE OF CORRECTION

PATENT NO. : 7,617,731 B2 Page 1 of 1
APPLICATION NO. : 11/718001
DATED : November 17, 2009
INVENTOR(S) : Takehiko Suginouchi, Yong Wang and Masahiko Hashimoto It is certified that error appears in the above-identified patent and that said Letters Patent is hereby corrected as shown below:

Title Page, Item (86), "PCT/JP2006/022377" should read -- PCT/JP2006/322377 --

Signed and Sealed this

Thirteenth Day of July, 2010

David J. Kappos
*Director of the United States Patent and Trademark Office*